(12) United States Patent
Hwang et al.

(10) Patent No.: US 7,617,426 B2
(45) Date of Patent: Nov. 10, 2009

(54) VERIFICATION METHOD AND APPARATUS

(75) Inventors: Sung-hee Hwang, Suwon-si (KR); Hyo-jin Sung, Seoul (KR); Sung-ryeul Rhyu, Yongin-si (KR); Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 11/643,813

(22) Filed: Dec. 22, 2006

(65) Prior Publication Data

US 2008/0031111 A1   Feb. 7, 2008

(30) Foreign Application Priority Data

Jun. 30, 2006   (KR) .................. 10-2006-0060688

(51) Int. Cl.
*G11C 29/00* (2006.01)

(52) U.S. Cl. .................. 714/723; 714/42; 714/5; 714/44; 714/703; 714/715; 714/720; 714/736; 714/742; 369/47.14; 369/53.15; 369/53.17

(58) Field of Classification Search ............ None
See application file for complete search history.

(56) References Cited

U.S. PATENT DOCUMENTS

| | | | |
|---|---|---|---|
| 6,714,502 B2 * | 3/2004 | Ko et al. ........... 369/53.35 |
| 6,779,137 B2 | 8/2004 | Ko et al. | |
| 6,782,493 B2 | 8/2004 | Ko et al. | |
| 6,782,494 B2 * | 8/2004 | Ko et al. ........... 714/42 |
| 6,785,839 B2 | 8/2004 | Ko et al. | |
| 6,804,797 B2 | 10/2004 | Ko et al. | |
| 6,845,473 B2 * | 1/2005 | Ko et al. ........... 714/42 |
| 6,892,327 B2 * | 5/2005 | Ko et al. ........... 714/42 |
| 6,912,672 B2 * | 6/2005 | Ko et al. ........... 714/42 |
| 7,289,404 B2 | 10/2007 | Park et al. ........ 369/53.17 |
| 7,385,889 B2 * | 6/2008 | Lee et al. ......... 369/47.14 |
| 2004/0190406 A1 * | 9/2004 | Hwang et al. ...... 369/47.1 |
| 2005/0083815 A1 * | 4/2005 | Park ............... 369/53.15 |
| 2006/0233078 A1 * | 10/2006 | Terada et al. ...... 369/53.24 |
| 2008/0253244 A1 * | 10/2008 | Nijboer et al. .... 369/47.15 |

* cited by examiner

*Primary Examiner*—John P Trimmings
(74) *Attorney, Agent, or Firm*—Stein McEwen, LLP

(57) ABSTRACT

A method for verifying whether a recording/reproducing apparatus properly produces disc management information and records the disc management information on a disc includes preparing a test disc; issuing reading commands to a recording/reproducing apparatus to be tested on which the test disc is loaded and verifying the disc in order to verify the reading operation; and issuing recording commands to the recording/reproducing apparatus to be tested on which the test disc is loaded and checking whether a temporary disc management area (TDMA) structure is properly updated on the disc in order to verify the modification operation.

37 Claims, 27 Drawing Sheets

| The latest TDMS | The latest TDDS | TDDS (2KB) | 64KB |
| --- | --- | --- | --- |
| | The latest SRRI | SRRI (62KB) | |
| | The latest TDFL | The first Cluster | 4*64KB for SL |
| | | The second Cluster | 8*64KB for DL |
| | | ... | (N=4 for SL and |
| | | The Nth Cluster | N=8 for DL) |

File structure of the TDMA mirror file

FIG. 7

| DMA Indicators Cluster (64KB) | 64KB |
|---|---|
| TDMAn Indicator Cluster (64KB) | n*64KB (n = 2 for SL disc and n = 5 for DL disc) |
| ... | |
| TDMA1 Indicator Cluster (64KB) | |

File structure of the TDMA Access Indicators mirror file

FIG. 8

| DMA1 | DDS1+SRRI (4 repetitions) | 4*64KB |
| --- | --- | --- |
| | DFL1 | 4*64KB for SL disc<br>8*64KB for DL disc |
| DMA2 | DDS2+SRRI (4 repetitions) | 4*64KB |
| | DFL2 | 4*64KB for SL disc<br>8*64KB for DL disc |
| DMA3 | DDS3+SRRI (4 repetitions) | 4*64KB |
| | DFL3 | 4*64KB for SL disc<br>8*64KB for DL disc |
| DMA4 | DDS4+SRRI (4 repetitions) | 4*64KB |
| | DFL4 | 4*64KB for SL disc<br>8*64KB for DL disc |

File structure of the DMA mirror file

FIG. 9A

First PSNs of Defective Clusters on TD-S00 disc or L0 of TD-D00 disc (120mm)

| # | PSN | # | PSN | # | PSN | # | PSN |
|---|---|---|---|---|---|---|---|
| 1 | 00 10 38 60h | 51 | 00 35 0F 80h | 101 | 00 65 58 C0h | 151 | 00 8D 9A A0h |
| 2 | 00 10 48 E0h | 52 | 00 37 9E 00h | 102 | 00 66 92 40h | 152 | 00 8F 0D A0h |
| 3 | 00 10 D2 60h | 53 | 00 38 E8 00h | 103 | 00 68 27 E0h | 153 | 00 8F DB E0h |
| 4 | 00 11 8C 00h | 54 | 00 39 6A A0h | 104 | 00 68 B0 00h | 154 | 00 8F E4 20h |
| 5 | 00 11 91 80h | 55 | 00 3C 7A 60h | 105 | 00 68 B9 A0h | 155 | 00 90 D4 C0h |
| 6 | 00 12 82 20h | 56 | 00 3E DA 20h | 106 | 00 68 D7 E0h | 156 | 00 91 04 E0h |
| 7 | 00 12 A3 20h | 57 | 00 3F D9 E0h | 107 | 00 6A 61 20h | 157 | 00 91 5B 80h |
| 8 | 00 14 2D C0h | 58 | 00 40 07 40h | 108 | 00 6A FD E0h | 158 | 00 92 17 E0h |
| 9 | 00 14 D5 80h | 59 | 00 40 8E 00h | 109 | 00 6B 02 00h | 159 | 00 92 C9 40h |
| 10 | 00 16 2D 40h | 60 | 00 41 34 60h | 110 | 00 6B 7F 20h | 160 | 00 92 E4 C0h |
| 11 | 00 18 E3 A0h | 61 | 00 42 59 40h | 111 | 00 6D 82 C0h | 161 | 00 93 04 60h |
| 12 | 00 19 E4 C0h | 62 | 00 43 19 C0h | 112 | 00 6D 91 E0h | 162 | 00 93 66 00h |
| 13 | 00 1A 09 E0h | 63 | 00 44 51 E0h | 113 | 00 6D BB 20h | 163 | 00 93 81 80h |
| 14 | 00 1A BC A0h | 64 | 00 44 69 40h | 114 | 00 6E EC 60h | 164 | 00 94 44 C0h |
| 15 | 00 1B 2E C0h | 65 | 00 45 24 40h | 115 | 00 6F A4 A0h | 165 | 00 94 63 00h |
| 16 | 00 1C 62 C0h | 66 | 00 45 55 C0h | 116 | 00 70 B7 A0h | 166 | 00 95 06 A0h |
| 17 | 00 1D 00 E0h | 67 | 00 45 80 60h | 117 | 00 71 5C A0h | 167 | 00 95 FC C0h |
| 18 | 00 20 16 20h | 68 | 00 47 46 20h | 118 | 00 73 30 20h | 168 | 00 99 37 20h |
| 19 | 00 20 4D 20h | 69 | 00 47 C4 A0h | 119 | 00 73 D6 80h | 169 | 00 99 DC 20h |
| 20 | 00 22 6C 40h | 70 | 00 4B 30 80h | 120 | 00 74 18 80h | 170 | 00 9D 41 20h |
| 21 | 00 23 0E 80h | 71 | 00 4C D1 20h | 121 | 00 74 86 80h | 171 | 00 9D 4D 80h |
| 22 | 00 23 58 C0h | 72 | 00 4C E4 60h | 122 | 00 74 BD 80h | 172 | 00 9D E4 C0h |
| 23 | 00 24 06 00h | 73 | 00 4D A6 40h | 123 | 00 74 C5 C0h | 173 | 00 9E 55 80h |
| 24 | 00 24 58 80h | 74 | 00 4D F8 C0h | 124 | 00 75 B3 A0h | 174 | 00 9F D2 60h |
| 25 | 00 24 F5 40h | 75 | 00 4F 98 00h | 125 | 00 76 70 00h | 175 | 00 A0 9C 80h |
| 26 | 00 25 A6 A0h | 76 | 00 50 24 40h | 126 | 00 76 F5 60h | 176 | 00 A0 D0 C0h |
| 27 | 00 25 B4 60h | 77 | 00 50 BB 80h | 127 | 00 77 78 00h | 177 | 00 A2 E3 80h |
| 28 | 00 28 AF 80h | 78 | 00 51 FE A0h | 128 | 00 79 6D E0h | 178 | 00 A2 E6 40h |
| 29 | 00 28 EA A0h | 79 | 00 52 26 80h | 129 | 00 79 A3 80h | 179 | 00 A3 6A 40h |
| 30 | 00 29 0D 00h | 80 | 00 52 81 40h | 130 | 00 79 E8 40h | 180 | 00 A3 BC C0h |
| 31 | 00 29 6D 40h | 81 | 00 53 CC A0h | 131 | 00 7A DB A0h | 181 | 00 A3 DC 60h |
| 32 | 00 29 ED 20h | 82 | 00 55 11 20h | 132 | 00 7A F3 00h | 182 | 00 A4 37 20h |
| 33 | 00 29 F5 60h | 83 | 00 55 FC 40h | 133 | 00 7B 2C C0h | 183 | 00 A4 5F 00h |
| 34 | 00 2A AC 40h | 84 | 00 57 61 C0h | 134 | 00 7B 9E E0h | 184 | 00 A4 7A 80h |
| 35 | 00 2A F7 E0h | 85 | 00 5A D3 20h | 135 | 00 7E 4E 60h | 185 | 00 A5 10 60h |
| 36 | 00 2B 60 60h | 86 | 00 5B 03 40h | 136 | 00 7E A5 00h | 186 | 00 A6 0E C0h |
| 37 | 00 2C 31 60h | 87 | 00 5B 12 60h | 137 | 00 83 AE C0h | 187 | 00 A7 2B 60h |
| 38 | 00 2D 32 80h | 88 | 00 5C DA E0h | 138 | 00 83 BC 80h | 188 | 00 A7 BF E0h |
| 39 | 00 2D 41 A0h | 89 | 00 5C DC 40h | 139 | 00 84 AE 80h | 189 | 00 AA 2A A0h |
| 40 | 00 2D BD 60h | 90 | 00 5E 70 80h | 140 | 00 84 B1 40h | 190 | 00 AA 64 60h |
| 41 | 00 2E A4 60h | 91 | 00 5F 56 20h | 141 | 00 87 2F 40h | 191 | 00 AC AA 00h |
| 42 | 00 2F 4E E0h | 92 | 00 5F FD E0h | 142 | 00 88 12 20h | 192 | 00 AD AF 40h |
| 43 | 00 31 AD 40h | 93 | 00 60 45 60h | 143 | 00 88 3C C0h | 193 | 00 AF 4B C0h |
| 44 | 00 32 05 40h | 94 | 00 60 99 40h | 144 | 00 88 C2 20h | 194 | 00 B1 B3 C0h |
| 45 | 00 32 27 A0h | 95 | 00 61 52 E0h | 145 | 00 89 A5 00h | 195 | 00 B2 28 A0h |
| 46 | 00 32 7E 40h | 96 | 00 62 72 40h | 146 | 00 89 F2 00h | 196 | 00 B2 C2 A0h |
| 47 | 00 32 D2 20h | 97 | 00 63 05 60h | 147 | 00 8A 73 40h | 197 | 00 B2 EB E0h |
| 48 | 00 33 8A 60h | 98 | 00 63 A4 E0h | 148 | 00 8A 87 E0h | 198 | 00 B5 9F 80h |
| 49 | 00 34 24 60h | 99 | 00 63 A6 40h | 149 | 00 8B 27 60h | 199 | 00 B7 0B E0h |
| 50 | 00 34 E3 80h | 100 | 00 64 74 80h | 150 | 00 8D 0B 60h | 200 | 00 B7 14 20h |

FIG. 9B

First PSNs of Defective Clusters on L1 of TD-D00 disc (120mm)

| | The first PSN of Defective Clusters on L1 of TD-D00 disc | | | | | | |
|---|---|---|---|---|---|---|---|
| 201 | 01 42 96 00h | 251 | 01 67 6D 20h | 301 | 01 97 B8 60h | 351 | 01 BF 69 00h |
| 202 | 01 42 A6 80h | 252 | 01 69 FB A0h | 302 | 01 98 EF E0h | 352 | 01 C1 6B 40h |
| 203 | 01 43 30 00h | 253 | 01 6B 45 A0h | 303 | 01 9A 85 60h | 353 | 01 C2 39 80h |
| 204 | 01 43 E9 E0h | 254 | 01 6B C8 40h | 304 | 01 9B 0D A0h | 354 | 01 C2 41 C0h |
| 205 | 01 43 EF 20h | 255 | 01 6E D8 00h | 305 | 01 9B 17 40h | 355 | 01 C3 32 60h |
| 206 | 01 44 DF C0h | 256 | 01 71 37 C0h | 306 | 01 9B 35 80h | 356 | 01 C3 62 80h |
| 207 | 01 45 00 C0h | 257 | 01 72 37 80h | 307 | 01 9C BE C0h | 357 | 01 C3 B9 20h |
| 208 | 01 46 8B 60h | 258 | 01 72 64 E0h | 308 | 01 9D 5B 80h | 358 | 01 C4 75 80h |
| 209 | 01 47 33 20h | 259 | 01 72 EB A0h | 309 | 01 9D 5F A0h | 359 | 01 C5 26 E0h |
| 210 | 01 48 8A E0h | 260 | 01 73 92 00h | 310 | 01 9D DC C0h | 360 | 01 C5 42 60h |
| 211 | 01 4B 41 40h | 261 | 01 74 B6 E0h | 311 | 01 9F E0 60 | 361 | 01 C5 62 00h |
| 212 | 01 4C 42 60h | 262 | 01 75 77 60h | 312 | 01 9F EF 80h | 362 | 01 C5 C3 A0h |
| 213 | 01 4C 67 80h | 263 | 01 76 AF 80h | 313 | 01 A0 18 C0h | 363 | 01 C5 DF 20h |
| 214 | 01 4D 1A 40h | 264 | 01 76 C8 E0h | 314 | 01 A1 4A 00h | 364 | 01 C6 A2 60h |
| 215 | 01 4D 8C 60h | 265 | 01 77 81 E0h | 315 | 01 A2 02 40h | 365 | 01 C6 C0 A0h |
| 216 | 01 4E C0 60h | 266 | 01 77 B3 60h | 316 | 01 A3 15 40h | 366 | 01 C7 64 40h |
| 217 | 01 4F 5E 80h | 267 | 01 77 DE 00h | 317 | 01 A3 BA 40h | 367 | 01 C8 5A 60h |
| 218 | 01 52 73 C0h | 268 | 01 79 A3 C0h | 318 | 01 A5 8D C0h | 368 | 01 CB 94 C0h |
| 219 | 01 52 AA C0h | 269 | 01 7A 22 40h | 319 | 01 A6 34 20h | 369 | 01 CC 39 C0h |
| 220 | 01 54 C9 E0h | 270 | 01 7D 8E 20h | 320 | 01 A6 76 20h | 370 | 01 CF 9E C0h |
| 221 | 01 55 6C 20h | 271 | 01 7F 2E C0h | 321 | 01 A6 E4 20h | 371 | 01 CF AB 20h |
| 222 | 01 55 B6 80h | 272 | 01 7F 42 00h | 322 | 01 A7 1B 20h | 372 | 01 D0 42 60h |
| 223 | 01 56 63 A0h | 273 | 01 80 03 E0h | 323 | 01 A7 23 60h | 373 | 01 D0 B3 20h |
| 224 | 01 56 B6 20h | 274 | 01 80 56 60h | 324 | 01 A8 11 40h | 374 | 01 D2 30 00h |
| 225 | 01 57 52 E0h | 275 | 01 81 F5 A0h | 325 | 01 A8 CD A0h | 375 | 01 D2 FA 20h |
| 226 | 01 58 04 40h | 276 | 01 82 81 E0h | 326 | 01 A9 53 00h | 376 | 01 D3 2E 60h |
| 227 | 01 58 12 00h | 277 | 01 83 19 20h | 327 | 01 A9 D5 A0h | 377 | 01 D5 41 20h |
| 228 | 01 5B 0D 20h | 278 | 01 84 5C 40h | 328 | 01 AB CB 80h | 378 | 01 D5 43 E0h |
| 229 | 01 5B 48 40h | 279 | 01 84 84 20h | 329 | 01 AC 01 20h | 379 | 01 D5 C7 E0h |
| 230 | 01 5B 6A a0h | 280 | 01 84 DE E0h | 330 | 01 AC 45 E0h | 380 | 01 D6 1A 60h |
| 231 | 01 5B CA E0h | 281 | 01 86 2A 40h | 331 | 01 AD 39 40h | 381 | 01 D6 3A 00h |
| 232 | 01 5C 4A c0h | 282 | 01 87 6E C0h | 332 | 01 AD 50 A0h | 382 | 01 D6 94 C0h |
| 233 | 01 5C 53 00h | 283 | 01 88 59 E0h | 333 | 01 AD 8A 60h | 383 | 01 D8 BC A0h |
| 234 | 01 5D 09 E0h | 284 | 01 89 BF 60h | 334 | 01 AD FC 80h | 384 | 01 D8 D8 20h |
| 235 | 01 5D 55 80h | 285 | 01 8D 30 C0h | 335 | 01 B0 AC 00h | 385 | 01 D7 6E 00h |
| 236 | 01 5D BE 00h | 286 | 01 8D 60 E0h | 336 | 01 B1 02 A0h | 386 | 01 D8 6C 60h |
| 237 | 01 5E 8F 00h | 287 | 01 8D 70 00h | 337 | 01 B6 0C 60h | 387 | 01 D9 89 00h |
| 238 | 01 5F 90 20h | 288 | 01 8F 38 80h | 338 | 01 B6 1A 20h | 388 | 01 DA 1D 80h |
| 239 | 01 5F 9F 40h | 289 | 01 8F 39 E0h | 339 | 01 B7 0C 20h | 389 | 01 DC 88 40h |
| 240 | 01 60 1B 00h | 290 | 01 90 CE 20h | 340 | 01 B7 0E E0h | 390 | 01 DC C2 00h |
| 241 | 01 61 02 00h | 291 | 01 91 B3 C0h | 341 | 01 B9 8C E0h | 391 | 01 DF 07 A0h |
| 242 | 01 61 AC 80h | 292 | 01 92 5B 80h | 342 | 01 BA 6F C0h | 392 | 01 E0 0C E0h |
| 243 | 01 64 0A E0h | 293 | 01 92 A3 00h | 343 | 01 BA 9A 60h | 393 | 01 E1 A9 60h |
| 244 | 01 64 62 E0h | 294 | 01 92 F6 E0h | 344 | 01 BB 1F C0h | 394 | 01 E4 11 60h |
| 245 | 01 64 85 40h | 295 | 01 93 B0 80h | 345 | 01 BC 02 A0h | 395 | 01 E4 88 40h |
| 246 | 01 64 DB E0h | 296 | 01 94 CF E0h | 346 | 01 BC 4F A0h | 396 | 01 E5 20 40h |
| 247 | 01 65 2F C0h | 297 | 01 95 63 00h | 347 | 01 BC D0 E0h | 397 | 01 E5 49 80h |
| 248 | 01 65 E8 00h | 298 | 01 96 02 80h | 348 | 01 BC E5 80h | 398 | 01 E7 FD 20h |
| 249 | 01 66 82 00h | 299 | 01 96 03 E0h | 349 | 01 BD 85 00h | 399 | 01 E9 69 80h |
| 250 | 01 67 41 20h | 300 | 01 96 D2 20h | 350 | 01 BE F8 40h | 400 | 01 E9 71 C0h |

FIG. 9C

First PSNs of Defective Clusters on TD-S00 disc or L0 of TD-D00 disc (80mm)

| | The first PSN of Defective Clusters on TD-S00 disc or L0 of TD-D00 disc | | | | |
|---|---|---|---|---|---|
| 1 | 00 10 38 60h | 21 | 00 23 0E 80h | 41 | 00 2E A4 60h | 
| 2 | 00 10 48 E0h | 22 | 00 23 58 C0h | 42 | 00 2F 4E E0h |
| 3 | 00 10 D2 60h | 23 | 00 24 06 00h | 43 | 00 31 AD 40h |
| 4 | 00 11 8C 00h | 24 | 00 24 58 80h | 44 | 00 32 05 40h |
| 5 | 00 11 91 80h | 25 | 00 24 F5 40h | 45 | 00 32 27 A0h |
| 6 | 00 12 82 20h | 26 | 00 25 A6 A0h | 46 | 00 32 7E 40h |
| 7 | 00 12 A3 20h | 27 | 00 25 B4 60h | 47 | 00 32 D2 20h |
| 8 | 00 14 2D C0h | 28 | 00 28 AF 80h | 48 | 00 33 8A 60h |
| 9 | 00 14 D5 80h | 29 | 00 28 EA A0h | 49 | 00 34 24 60h |
| 10 | 00 16 2D 40h | 30 | 00 29 0D 00h | 50 | 00 34 E3 80h |
| 11 | 00 18 E3 A0h | 31 | 00 29 6D 40h | 51 | 00 35 0F 80h |
| 12 | 00 19 E4 C0h | 32 | 00 29 ED 20h | 52 | 00 37 9E 00h |
| 13 | 00 1A 09 E0h | 33 | 00 29 F5 60h | 53 | 00 38 E8 00h |
| 14 | 00 1A BC A0h | 34 | 00 2A AC 40h | 54 | 00 39 6A A0h |
| 15 | 00 1B 2E C0h | 35 | 00 2A F7 E0h | 55 | 00 3C 7A 60h |
| 16 | 00 1C 62 C0h | 36 | 00 2B 60 60h | 56 | 00 3E DA 20h |
| 17 | 00 1D 00 E0h | 37 | 00 2C 31 60h | 57 | 00 3F D9 E0h |
| 18 | 00 20 16 20h | 38 | 00 2D 32 80h | 58 | 00 40 07 40h |
| 19 | 00 20 4D 20h | 39 | 00 2D 41 A0h | 59 | 00 40 8E 00h |
| 20 | 00 22 6C 40h | 40 | 00 2D BD 60h | 60 | 00 41 34 60h |
| | | | | 61 | 00 42 59 40h |
| | | | | 62 | 00 43 19 C0h |
| | | | | 63 | 00 44 51 E0h |
| | | | | 64 | 00 44 69 40h |
| | | | | 65 | 00 45 24 40h |
| | | | | 66 | 00 45 55 C0h |
| | | | | 67 | 00 45 80 60h |
| | | | | 68 | 00 47 46 20h |
| | | | | 69 | 00 47 C4 A0h |

FIG. 9D

First PSNs of Defective Clusters on L1 of TD-D00 disc (80mm)

| | | | The first PSN of Defective Clusters on L1 of TD-D00 disc | | | |
|---|---|---|---|---|---|---|
| 70 | 01 B6 0C 60h | 90 | 01 C3 B9 20h | 110 | 01 D5 41 20h | 130 | 01 E5 49 80h |
| 71 | 01 B6 1A 20h | 91 | 01 C4 75 80h | 111 | 01 D5 43 E0h | 131 | 01 E7 FD 20h |
| 72 | 01 B7 0C 20h | 92 | 01 C5 26 E0h | 112 | 01 D5 C7 E0h | 132 | 01 E9 69 80h |
| 73 | 01 B7 0E E0h | 93 | 01 C5 42 60h | 113 | 01 D6 1A 60h | 133 | 01 E9 71 C0h |
| 74 | 01 B9 8C E0h | 94 | 01 C5 62 00h | 114 | 01 D6 3A 00h | | |
| 75 | 01 BA 6F C0h | 95 | 01 C5 C3 A0h | 115 | 01 D6 94 C0h | | |
| 76 | 01 BA 9A 60h | 96 | 01 C5 DF 20h | 116 | 01 D6 BC A0h | | |
| 77 | 01 BB 1F C0h | 97 | 01 C6 A2 60h | 117 | 01 D6 D8 20h | | |
| 78 | 01 BC 02 A0h | 98 | 01 C6 C0 A0h | 118 | 01 D7 6E 00h | | |
| 79 | 01 BC 4F A0h | 99 | 01 C7 64 40h | 119 | 01 D8 6C 60h | | |
| 80 | 01 BC D0 E0h | 100 | 01 C8 5A 60h | 120 | 01 D9 89 00h | | |
| 81 | 01 BC E5 80h | 101 | 01 CB 94 C0h | 121 | 01 DA 1D 80h | | |
| 82 | 01 BD 85 00h | 102 | 01 CC 39 C0h | 122 | 01 DC 88 40h | | |
| 83 | 01 BE F8 40h | 103 | 01 CF 9E E0h | 123 | 01 DC C2 00h | | |
| 84 | 01 BF 69 00h | 104 | 01 CF AB 20h | 124 | 01 DF 07 A0h | | |
| 85 | 01 C1 6B 40h | 105 | 01 D0 42 60h | 125 | 01 E0 0C E0h | | |
| 86 | 01 C2 39 80h | 106 | 01 D0 B3 20h | 126 | 01 E1 A9 60h | | |
| 87 | 01 C2 41 C0h | 107 | 01 D2 30 00h | 127 | 01 E4 11 60h | | |
| 88 | 01 C3 32 60h | 108 | 01 D2 FA 20h | 128 | 01 E4 86 40h | | |
| 89 | 01 C3 62 80h | 109 | 01 D3 2E 60h | 129 | 01 E5 20 40h | | |

FIG. 10

| The first TDMS Update Unit | Initialized TDFL (2KB) | |
| --- | --- | --- |
| | 00h (58KB) | |
| | Initialized SRRI (2KB) | |
| | Initialized TDDS (2KB) | |
| Intermediate TDMS Update Units | (M-1)*64KB – 2KB | The latest TDFL and the latest SRRI are pointed in the latest TDDS |
| The latest TDMS Update Unit | | |
| | The latest TDDS (2KB) | |

File structure of the TDMA image file

FIG. 11

| TDMAn Indicator Cluster | 1st copy of TDDS (2KB) | |
| --- | --- | --- |
| | ... | |
| | 32th copy of TDDS (2KB) | |
| ... | ... | n*64KB |
| TDMA1 Indicator Cluster | 1st copy of TDDS (2KB) | |
| | ... | |
| | 32th copy of TDDS (2KB) | |

File structure of the TDMA Access Indicators image file

FIG. 12

| 1st Cluster | 1st PSN of the Physical Cluster which this Cluster will be recorded on (4bytes) + 00h (2044 bytes) | 64KB |
|---|---|---|
| | 2nd PSN of the Physical Cluster which this Cluster will be recorded on (4bytes) + 00h (2044 bytes) | |
| | ... | |
| | 32nd PSN of the Physical Cluster which this Cluster will be recorded on (4bytes) + 00h (2044 bytes) | |
| 2nd Cluster | 1st PSN of the Physical Cluster which this Cluster will be recorded on (4bytes) + 00h (2044 bytes) | 64KB |
| | 2nd PSN of the Physical Cluster which this Cluster will be recorded on (4bytes) + 00h (2044 bytes) | |
| | ... | |
| | 32nd PSN of the Physical Cluster which this Cluster will be recorded on (4bytes) + 00h (2044 bytes) | |
| ... | | |
| Nth Cluster | 1st PSN of the Physical Cluster which this Cluster will be recorded on (4bytes) + 00h (2044 bytes) | 64KB |
| | 2nd PSN of the Physical Cluster which this Cluster will be recorded on (4bytes) + 00h (2044 bytes) | |
| | ... | |
| | 32nd PSN of the Physical Cluster which this Cluster will be recorded on (4bytes) + 00h (2044 bytes) | |

File structure of the Disc image file

FIG. 14

Test mode and Test condition for each Test mode

| Recording Mode | Test Mode | |
|---|---|---|
| DM-on and LOW-off (SRM without LOW) | "Recording Operation" | Recording |
| | | Disc Closing |
| | "Reading & Modification" | Reading |
| | | Modification |
| DM-on and LOW-on (SRM with LOW) | "Recording Operation" | Recording |
| | | Disc Closing |
| | "Reading & Modification" | Reading |
| | | Modification |

FIG. 15

Test process vs. Test disc and Checking Items

| Test process | | | Test Disc (80mm/120mm) | | Checking items |
|---|---|---|---|---|---|
| | | | SL | DL | |
| DM-on and LOW-off (SRM without LOW) | "Recording Operation" | Recording | TD-S00 | TD-D00 | Check TDMA structure compliance. Check TDMA Access Indicators compliance. Check whether TDFL contains TDFL entries, which were generated by known defects based on recording locations of test scenario. Check whether SRRI entries comply with recorded status based on recording scenario. |
| | | Disc Closing | TD-S01 | TD-D01 | Check DMA structure compliance. Check TDMA Access Indicators compliance. Check whether DMS is identical to the latest TDMS. |
| | "Reading & Modification" | Reading | TD-S10 | TD-D10 | Check data conformance based on TDFL entries. |
| | | Modification | TD-S10 | TD-D10 | Check TDMA structure compliance. Check TDMA Access Indicators compliance. Check whether TDFL contains TDFL entries, which were generated by known defects based on recording locations of test scenario. Check whether SRRI entries comply with recorded status based on recording scenario. |
| DM-on and LOW-on (SRM with LOW) | "Recording Operation" | Recording | TD-S00 | TD-D00 | Check TDMA structure compliance. Check TDMA Access Indicators compliance. Check whether TDFL contains TDFL entries, which were generated by known defects and/or LOW based on recording locations of test scenario. Check whether SRRI entries comply with recorded status based on recording scenario. |
| | | Disc Closing | TD-S02 | TD-D02 | Check DMA structure compliance. Check TDMA Access Indicators compliance. Check whether DMS is same as the latest TDMS. |
| | "Reading & Modification" | Reading | TD-S20 | TD-D20 | Check data conformance based on TDFL entries. |
| | | Modification | TD-S20 | TD-D20 | Check TDMA structure compliance. Check TDMA Access Indicators compliance. Check whether TDFL contains TDFL entries, which were generated by known defects and/or LOW based on recording locations of test scenario. Check whether SRRI entries comply with recorded status based on recording scenario. |

FIG. 18

Checklist for TDMA Access Indicators verification

| Class | Items | RBP | # of bytes | Expected value |
|---|---|---|---|---|
| TDMA Access Indicators | Location of indicator Clusters | NA | NA | SL: 00 0E E0 00h – 00 0E E0 5Fh<br>DL: 00 0E E0 00h – 00 0E E0 BFh |
| | Marked status of indicator Clusters | NA | NA | Shall indicate TDMA which is currently in use. |
| | Error condition of indicator Clusters | NA | NA | No uncorrectable error |
| | Contents of indicator Clusters | NA | NA | Shall be 32 copies of TDDS |
| | Unused area | | | Shall be unrecorded |
| | Integrity of indicator Clusters | NA | NA | - |

RBP: Relative byte position from start byte of each DDS and DFL

FIG. 19

Checklist for TDMA verification

| Class | Items | RBP | # of bytes | Expected value |
|---|---|---|---|---|
| TDMA | Location of TDMAs | NA | NA | |
| | Location of the latest TDDS | NA | NA | The last Data Frame of the last of the Clusters constituting a TDMS |
| | Error condition of the latest TDDS | NA | NA | No uncorrectable error |
| | Error condition of the latest TDFL | NA | NA | No uncorrectable error |
| | Error condition of the latest SRRI | NA | NA | No uncorrectable error |
| | Additional TDMA_size fields in the latest TDDS | 1040 to 1051 | 12 | Shall be same as those of the indicator Clusters |
| | Pointers for TDFL in the latest TDDS | 1120 to 1151 | 32 | Shall be addresses in same TDMA and addresses in the TDMA which is currently in use known by indicator Clusters. |
| | Pointer for SRRI in the latest TDDS | 1184 to 1187 | 4 | |

RBP: Relative byte position from start byte of each DDS and DFL

FIG. 20

Checklist for DMA verification

| Class | Items | RBP | # of bytes | Expected value |
|---|---|---|---|---|
| DMA | Location of DMAs 1,2,3 and 4 | NA | NA | |
| | Error condition of 16 DDS | NA | NA | No uncorrectable error |
| | DDS Update Count | NA | NA | Shall be same as that of the latest TDDS |
| | Contents of 4 DDS1 in DMA1 | NA | NA | Shall be identical |
| | Contents of 4 DDS2 in DMA2 | NA | NA | Shall be identical |
| | Contents of 4 DDS3 in DMA3 | NA | NA | Shall be identical |
| | Contents of 4 DDS4 in DMA4 | NA | NA | Shall be identical |
| | Error condition of 4 DFL | NA | NA | No uncorrectable error |
| | DFL Update Count | NA | NA | Shall be same as that of the latest TDFL |
| | Contents of 4 DFL | NA | NA | Shall be identical |

RBP: Relative byte position from start byte of each DDS and DFL

FIG. 21A

Checklist for TDDS verification

| Class | Items | Data Frame | RBP | # of bytes | Expected value |
|---|---|---|---|---|---|
| TDDS | TDDS identifier | 31 | 0 | 2 | 4453h |
| | TDDS format | 31 | 2 | 1 | 00h |
| | Reserved and set to 00h | 31 | 3 | 1 | 00h |
| | TDDS Update Count | 31 | 4 | 4 | N |
| | Reserved and set to 00h | 31 | 8 | 8 | 00h |
| | First PSN of Drive Area | 31 | 16 | 4 | P_DA |
| | Reserved and set to 00h | 31 | 20 | 4 | 00h |
| | First PSN of Defect List | 31 | 24 | 4 | 00h |
| | Reserved and set to 00h | 31 | 28 | 4 | 00h |
| | Location of LSN 0 of User Data Area | 31 | 32 | 4 | 00 12 00 00h |
| | Last LSN of User Data Area | 31 | 36 | 4 | Last LSN |
| | SA size | 31 | 40 | 12 | SA size |

FIG. 21B

| | | | | |
|---|---|---|---|---|
| Spare Area Full flags | 31 | 52 | 1 | 0?h |
| Reserved and set to 00h | 31 | 53 | 3 | 00h |
| Pre-write Area flags | 31 | 56 | 1 | |
| Reserved and set to 00h | 31 | 57 | 7 | 00h |
| Status bits of PAC locations | 31 | 64 | 32 | - |
| Reserved and set to 00h | 31 | 96 | 928 | |
| Recording Mode | 31 | 1024 | 1 | 0000 00?0 b |
| General flag bits | 31 | 1025 | 1 | 00h |
| Inconsistency flags | 31 | 1026 | 2 | 00h (TBD) |
| Reserved and set to 00h | 31 | 1028 | 4 | |
| Last Recorded Address of User Data Area | 31 | 1032 | 4 | LRA- |
| Reserved and set to 00h | 31 | 1036 | 4 | |
| TDMA sizes in SAs | 31 | 1040 | 12 | |
| Reserved and set to 00h | 31 | 1052 | 36 | |
| Next available PSNs of Test Zone. | 31 | 1088 | 8 | P_TZ |

FIG. 21C

| | | | | |
|---|---|---|---|---|
| Reserved and set to 00h | 31 | 1096 | 8 | |
| Next available PSNs of DCZ. | 31 | 1104 | 8 | P_CZ |
| Reserved and set to 00h | 31 | 1112 | 8 | |
| First PSN of nth Cluster of Defect List | 31 | 1120 | 8*4 | P_nth DFL |
| Reserved and set to 00h | 31 | 1152 | 32 | |
| First PSNs of SRRI/SBM | 31 | 1184 | 8 | P_SRRI/P_SBM |
| Reserved and set to 00h | 31 | 1192 | 24 | |
| Next available PSNs of SA | 31 | 1216 | 16 | P_SAs |
| Reserved and set to 00h | 31 | 1232 | 684 | |
| Year/Month/Date of recording | 31 | 1916 | 4 | |
| Drive ID: Manufacturer Name/ Additional ID/Unique Serial Number | 31 | 1920 | 128 | |
| Integrity of TDDS | NA | NA | NA | - |

RBP: Relative byte position from start byte of each DDS and DFL

FIG. 22

Checklist for TDFL verification

| Class | Items | Cl. nr /Data Frame | RBP | # of bytes | | Expected value |
|---|---|---|---|---|---|---|
| DFL | DFL identifier | 0/0 | 0 | 2 | | 444Ch |
| | DFL format | 0/0 | 2 | 1 | | 00h |
| | reserved | 0/0 | 3 | 1 | | 00h |
| | DFL Update Count | 0/0 | 4 | 4 | | |
| | reserved | 0/0 | 8 | 4 | | 00h |
| | number of DFL entries (N_DFL) | 0/0 | 12 | 4 | | N_DFL |
| | number of RAD/CRD entries | 0/0 | 16 | 4 | | N_RAD |
| | number of NRD entries | 0/0 | 20 | 4 | | N_NRD |
| | reserved | 0/0 | 24 | 40 | | 00h |
| | DFL entries | | 64 | 8*N_DFL | | - |
| | DFL terminator | k/n | {N_DFL*8 + 64 − n*2048 − k*65536} | 8 | b63-b32 | FFFFFFFFh |
| | | | | | b31-b0 | |
| | reserved | k/n | {(N_DFL+1)*8 + 64 − n*2048 − k*65536} to 2047 | | | 00h |
| | Integrity of DFL (Sorting order) | NA | NA | NA | | - |

RBP: Relative byte position from start byte of each DDS and DFL

FIG. 23

Checklist for SRRI verification

| Class | Items | Cl. nr /Data Frame | RBP | # of bytes | Expected value |
|---|---|---|---|---|---|
| SRRI | SRRI identifier | 31-M | 0 | 2 | 5352h |
| | SRRI format | 31-M | 2 | 1 | 00h |
| | reserved | 31-M | 3 | 1 | 00h |
| | SRRI Update Count | 31-M | 4 | 4 | |
| | reserved | 31-M | 8 | 4 | 00h |
| | number of SRR entries (N_SRR) | 31-M | 12 | 4 | N_SRR |
| | number of Open SRRs | 31-M | 16 | 1 | Not more than 16 |
| | reserved | 31-M | 17 | 3 | |
| | List of Open SRR numbers | 31-M | 20 | 16*2 | |
| | Reserved | 31-M | 52 | 12 | 00h |
| | SRR entries | | 64 | 8*N_SRR | - |
| | SRR terminator | 30 | {N_SRRI*8 + 64 − (M-1)*2048} | 8 b63-b32 | FFFFFFFFh |
| | | | | b31-b0 | |
| | reserved | 30 | {(N_SRRI+1)*8 + 64 − (M-1)*2048} to 2047 | .. | 00h |
| | Integrity of SRRI (Sorting order) | NA | NA | NA | - |

RBP: Relative byte position from start byte of each DDS and DFL

FIG. 24A

Items for "Recording" test and "Modification" test

| Class | Item | Value (80mm: 7.8GB/L, 120mm: 23.3GB/L) |
|---|---|---|
| TDMA Access Indicators | Location | SEE FIG. 18 |
| | Marked status | Shall indicate TDMA which is currently in use |
| | Error condition of indicator Cluster | No Uncorrectable error |
| | Contents of indicator Cluster | Shall be TDDS |
| | Unused area | Shall be unrecorded |
| | Integrity | |
| The latest TDDS | TDDS identifier | 4453h |
| | TDDS Update Count | N- |
| | First PSN of Drive Area | P_DA |
| | First PSN of Defect List | 00h |
| | Location of LSN 0 of User Data Area | 00 12 00 00h |
| | Last LSN of User Data Area | Last LSN |
| | Inner Spare Area 0 size | 00 00 10 00h |
| | Outer Spare Area 1 size | OSA_size |
| | Inner Spare Area 1 size | ISA1_size |
| | Spare Area Full flags | SL 000000??b |
| | | DL 0000????b |
| | Recording Mode | 000000?0b |
| | General flag bits | 00000000b |
| | Inconsistency flags | 00h |
| | LRA of User Data | Real LRA |
| | TDMA sizes in SAs | - |

FIG. 24B

| | | |
|---|---|---|
| | DFL pointers | - |
| | SRRI pointer | - |
| | Next available PSNs of SAs | - |
| | Integrity of TDDS | - |
| The latest TDFL | DFL identifier | 444Ch |
| | DFL Update Count | -N |
| | number of DFL entries | N_DFL |
| | number of RAD/CRD entries | - |
| | number of NRD entries | - |
| | Integrity of DFL entries | |
| | DFL terminator | b63-b32 FFFFFFFFh |
| | | b31-b0 -N |
| | Blank area | 00h |
| | Integrity of DFL | Sorting order |
| | | N_DFL, N_RAD/CRD, N_NRD |
| The latest SRRI | SRRI identifier | 5352h |
| | SRRI format | 00h |
| | SRRI Update Count | -N |
| | N_SRR | - |
| | number of Open SRRs | Not more than 16 |
| | List of Open SRR numbers | - |
| | Integrity of SRR entries | |
| | SRR terminator | b63-b32 FFFFFFFFh |
| | | b31-b0 -N |
| | Integrity of SRRI | Sorting order |

FIG. 25
Items for "Disc Closing" test

| Class | Item | Value (80mm: 7.8GB/L, 120mm: 23.3GB/L) |
|---|---|---|
| TDMA Access Indicators | Location | SEE FIG. 18 |
| | Marked status | Shall indicate DMA |
| | Error condition of indicator Cluster | No Uncorrectable error |
| | Contents of indicator Cluster | Shall be TDDS in DMA1 |
| | Unused area | - |
| DDS | Same as the latest TDDS | Same as the latest TDDS except "First PSN of DFL" field |
| DFL | Same as the latest TDFL | Same as the latest TDFL |
| SRRI | Same as the latest SRRI | Same as the latest SRRI |

FIG. 26
Items for "Reading" test

| Class | Item | Value (80mm: 7.8GB/L, 120mm: 23.3GB/L) |
|---|---|---|
| Disc Contents | Conformance of contents in User Data Area | Same as reference data mirror file |
| The latest TDFL | Correct reading of the latest TDFL | - |

VERIFICATION METHOD AND APPARATUS

CROSS-REFERENCE TO RELATED PATENT APPLICATION

This application claims the benefit of Korean Patent Application No. 2006-60688, filed on 30 Jun. 2006 in the Korean Intellectual Property Office, the disclosure of which is incorporated herein in its entirety by reference.

BACKGROUND OF THE INVENTION

1. Field of the Invention

Aspects of the present invention relate to the recording/reading of a disc, and more particularly, to a method of verifying whether a recording/reproducing apparatus properly processes temporary disc management area information generated by recording/reading data and an apparatus for performing the method.

2. Description of the Related Art

Blu-ray disc recordable (BD-R) discs have a recording function capable of replacing a disc defect with a normal recording area, which is referred to as defect management. Also, user data areas of BD-R discs are divided into a plurality of sequential recording ranges (SRRs) so that each SRR can perform incremental recording, which is referred to as a sequential recording mode (SRM). By a write command from a host PC for a previously recorded area recorded o, replacement data for replacing data in a recorded area can be recorded in an unrecorded area, which is referred to as logical overwrite (LOW).

A temporary disc management area (TDMA) stores information necessary for the general use and management of BD-R discs prior to the disc being closed. The TDMA is allocated in a lead-in zone on a BD-R disc and additionally in a part of a spare area of a user data area so that a plurality of TDMAs are allocated on the BD-R disc and are sequentially used.

TDMA information comprises a temporary disc definition structure (TDDS), a temporary defect list (TDFL), sequential recording range information (SRRI), etc. The BD-R disc additionally requires an access TDMA (ATDMA) to easily and quickly find out location information on which a final TDMA is recorded since the plurality of TDMA areas are allocated in the BD-R disc. Once closed, the final TDMA is used to create a Defect Management Area (DMA) structure.

The ATDMA is recorded in the lead-in zone and includes the TDDS in order to be informed of physical location information of the TDMAs allocated to the BD-R disc from the TDDS. The TDDS comprises size and location information of the spare area allocated to the BD-R disc and location information in which the SRRI and the TDFL are recorded. The TDFL comprises information about a defect found when the BD-R disc is used, information to be replaced with the information about the defect, and replacement information by the LOW. The SRRI comprises information about each of the SRRs according to sequential recording.

Since the TDMA information is closely related to a physical recording location of data, a recording/reproducing apparatus can use a BD-R disc on which the TDMA information produced or changed by another recording/reproducing apparatus is recorded. When a detachable recording medium has a problem in terms of compatibility between recording/reproducing apparatuses an error occurs in the TDMA information. If the TDMA information, which is used to easily and quickly find out location information in which the final TDMA is recorded, is not properly produced, there is a compatibility problem between recording/reproducing apparatuses. To address the problem, a means and method of verifying whether a recording/reproducing apparatus exactly analyzes TDMA information and ATDMA information from BD-R discs and correctly records the TDMA information and the ATDMA information on BD-R discs are required.

SUMMARY OF THE INVENTION

Aspects of the present invention provide a method and apparatus for verifying whether a recording/reproducing apparatus properly produces disc management information and records the disc management information on a disc.

According to an aspect of the present invention, there is provided a method of verifying whether a recording/reproducing apparatus that records/reproduces a disc properly performs reading and modification operations, the method comprising: preparing a test disc; issuing read commands to a recording/reproducing apparatus to be tested on which the test disc is loaded and verifying the disc in order to verify the reproducing operation; and issuing write commands to the recording/reproducing apparatus to be tested on which the test disc is loaded and checking whether a temporary disc management area (TDMA) structure is properly updated on the disc in order to verify the modification operation.

According to an aspect of the present invention, there is provided an apparatus for verifying whether a recording/reproducing apparatus that records/reproduces a disc properly performs reproducing and modification operations, wherein the apparatus issues read commands to a recording/reproducing apparatus to be tested on which the test disc is loaded and verifies the disc in order to verify the reproducing operation; and issues write commands to the recording/reproducing apparatus to be tested on which the test disc is loaded and checks whether a temporary disc management area (TDMA) structure is properly updated on the disc in order to verify the modification operation.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and/or advantages of the present invention will become more apparent and more readily appreciated by describing in detail exemplary embodiments thereof with reference to the accompanying drawings in which:

FIG. 7 is a table of a structure of a TDMA access indicators mirror file according to an embodiment of the present invention;

FIG. 8 is a table of a structure of a DMA mirror file according to an embodiment of the present invention;

FIGS. 9A and 9B are tables of locations of defective clusters on a TD-S00 disc having a thickness of 120 mm according to an embodiment of the present invention;

FIGS. 9C and 9D are tables of locations of defective clusters on a TD-S00 disc having a thickness of 80 mm according to an embodiment of the present invention;

FIG. 10 is a table of a structure of a TDMA image file according to an embodiment of the present invention;

FIG. 11 is a table of a structure of a TDMA access indicators image file according to an embodiment of the present invention;

FIG. 12 is a table of a structure of a disc image file according to an embodiment of the present invention;

FIG. 14 is a table of test modes according to an embodiment of the present invention;

FIG. 15 is a table of check items and test processes according to an embodiment of the present invention;

FIG. 18 is a table of a checklist for TDMA access indicators verification according to an embodiment of the present invention;

FIG. 19 is a table of a checklist for TDMA verification according to an embodiment of the present invention;

FIG. 20 is a table of a checklist for DMA verification according to an embodiment of the present invention;

FIGS. 21A through 21C are tables of a checklist for temporary disc definition structure (TDDS) verification according to an embodiment of the present invention;

FIG. 22 is a table of a checklist for temporary defect list (TDFL) verification according to an embodiment of the present invention;

FIG. 23 is a table of a checklist for sequential recording range information (SRRI) verification according to an embodiment of the present invention;

FIGS. 24A and 24B are tables of contents of items for a recording test and a modification test according to an embodiment of the present invention;

FIG. 25 is a table of contents of items for a disc closing test according to an embodiment of the present invention; and FIG. 26 is a table of contents of items for a reading test according to an embodiment of the present invention.

DETAILED DESCRIPTION OF THE INVENTION

Figure 1:
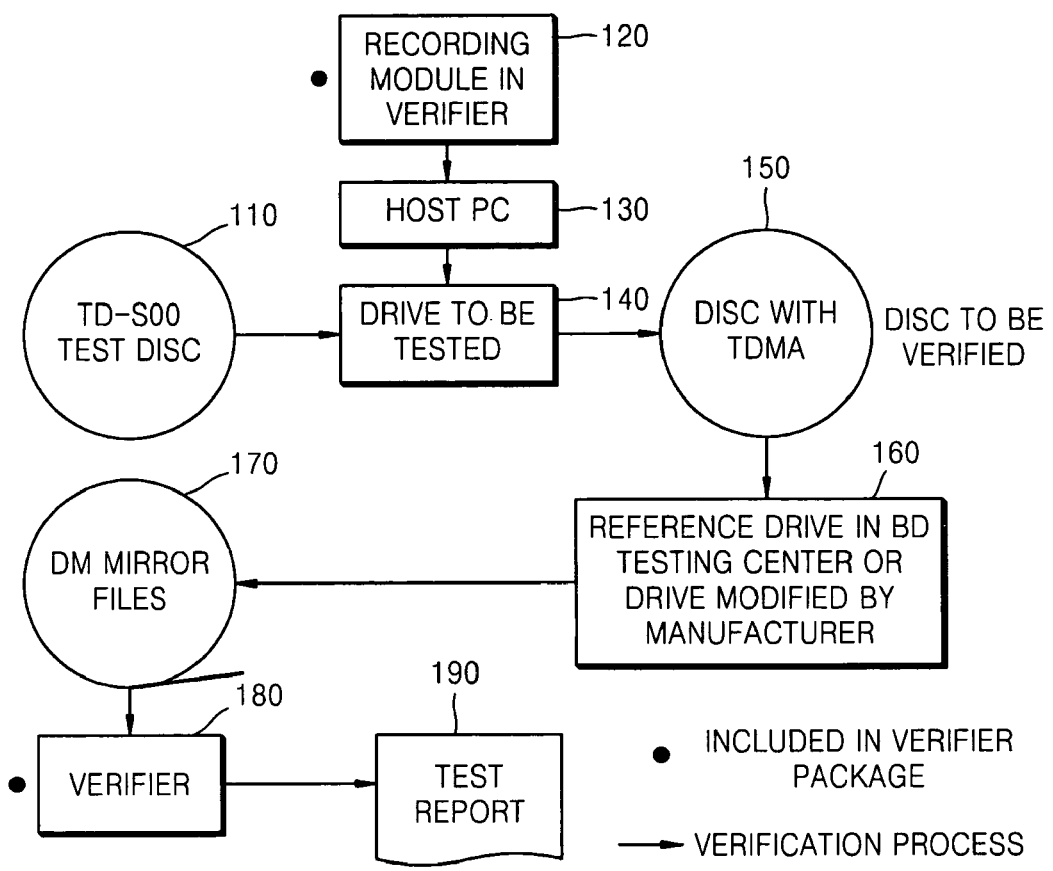
FIG. 1 is a diagram of a recording test system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The drive, which is to be tested, is verified by the verifier whose main function is to scan and analyze mirror files in order to decide the validity of the mirror files, which thereby reflects the validity of the drive to be tested. Mirror files are generated from discs, by using a reference drive in a Blu-ray disc (BD) Testing Center or a drive modified by its manufacturer.

A "Recording Operation" test covers the whole recording procedure from initializing a blank disc to closing the disc. The test consists of two separate but sequential sub-tests: a "Recording" test and a "Disc Closing" test. That is, the "Disc Closing" test can be done only with a disc which has successfully passed the preceding "Recording" test.

The "Recording" test starts with initialization of a blank disc, and then performs pre-determined recording operations on the disc. A temporary disc management area (TDMA) structure created on the disc is verified in the form of a mirror file. The "Disc Closing" test verifies a Defect Management Area (DMA) structure formed after closing the disc based on the TDMA structure created before closing the disc.

A "Reading & Modification" test uses a disc pre-recorded with specified data in order to test compatibility of drives by reading contents and modifying data on the disc. The test consists of two sub-tests, a "Reading" test and a "Modification" test. These tests need a preparation step in which a common test disc form is made. The "Reading" test is a simple 1:1 data conformance check based on temporary defect list (TDFL) entries between a reference data mirror file and a data mirror file, which has to be verified. The "Modification" test is to check if the TDMA structure is updated properly after modification of data on the disc.

FIG. 1 is a diagram of a recording test system according to an embodiment of the present invention. Referring to FIG. 1, in a "Recording" test, a TD-S00 (TD-D00) test disc 110, which is a blank disc, is used as an input to the drive 140, which is to be tested. When the TD-S00 (TD-D00) test disc 110 (which may be provided by the BD Test Center) is loaded into the drive 140, the drive 140 performs a mode specific "Recording" test on the disc 110, according to given recording modes. The test starts with initializing (that is, formatting) the disc 110. The detailed formatting process depends on the type of test scenario. Each test scenario has a different setting and sequence of operations. Then, the drive 140 performs specific recording operations, generating a disc 150 with a TDMA as a result. The instructions to perform these recording operations are given by a recording module 120 in a verifier, which is specially designed to issue drive-level WRITE instructions directly to the drive 140, and bypassing a host PC 130.

Using this disc 150 with the TDMA, DM mirror files 170, which are a TDMA mirror file and a TDMA Access Indicators mirror file, are generated by a reference drive in a BD Test Center or a drive 160 modified by its manufacturer. These mirror files 170 conform to a specified file format of the DM mirror files 170. The final step is verification by the verifier 180 of these DM mirror files 170 and preparation of a test report 190, based on the specification and detailed check items of the given test scenario (or mode) undergoing the "Recording test."

With regard to the write mode, since it is impossible to change data without DM, the DM off mode is not allowed but the DM on and LOW on mode and DM on and LOW off mode are allowed. The DM on and LOW on mode is a write mode in which a linear replacement of the DM is enabled and LOW is enabled. The DM on and LOW off mode is a write mode in which the linear replacement of the DM is enabled and LOW is not enabled.

Figure 2:
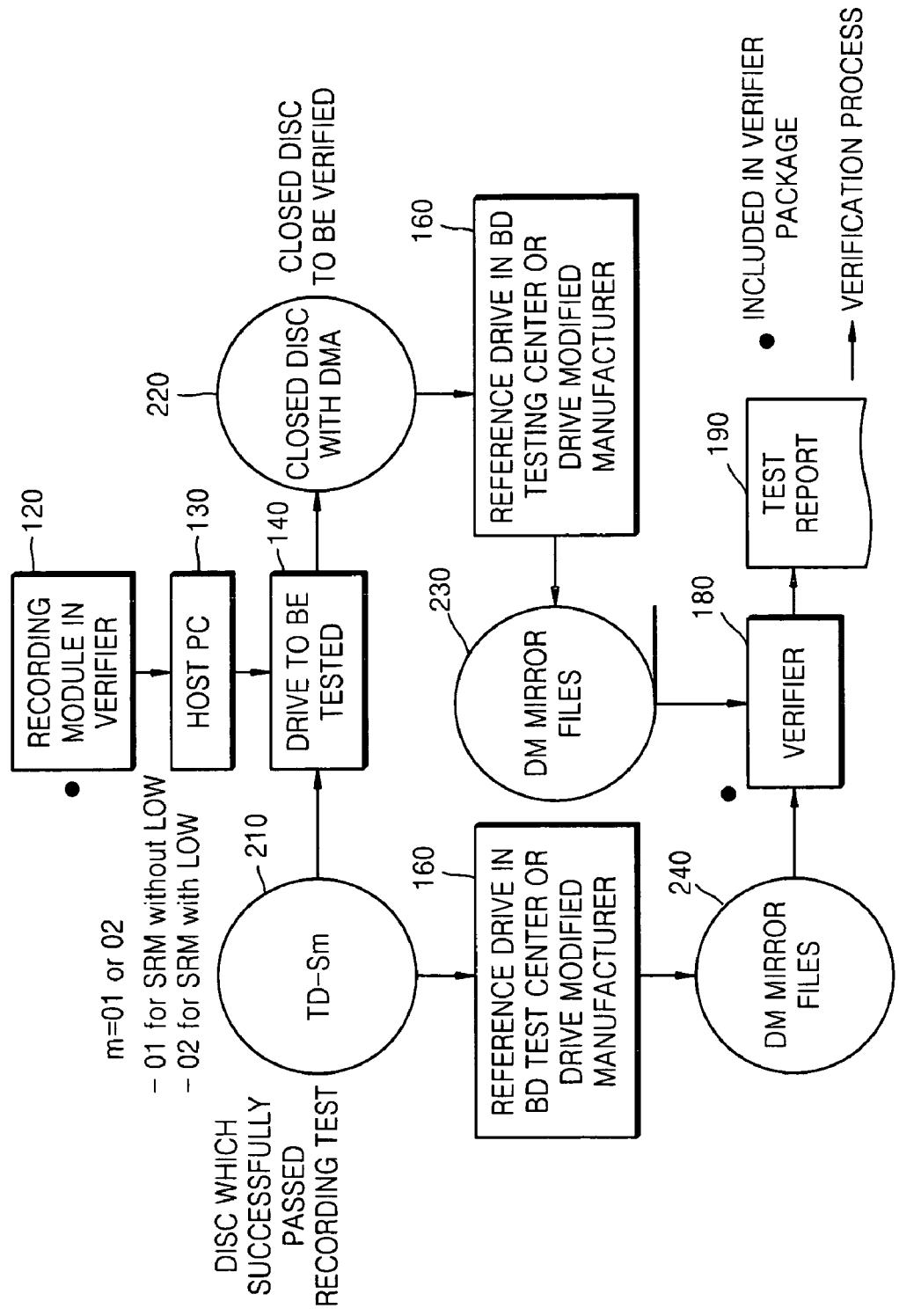
FIG. 2 is a diagram of a disc closing test system according to an embodiment of the present invention.

FIG. 2 is a diagram of a disc closing test system according to an embodiment of the present invention. Referring to FIG. 2, in the "Disc Closing" test, the TD-Sm (TD-Dm) (m=01 for sequential recording mode (SRM) without LOW, m=02 for SRM with LOW) Test Disc 210, which successfully passed the preceding "Recording" test, is used as an input to the drive 140, which is to be tested. Therefore, in the shown embodiment the test is possible only after the "Recording" test has succeeded at least once and produced the disc 150 with TDMA as output to provide the disc 210.

In order for the verifier 180 to check a DMA structure based on a TDMA structure, two steps for mirror files 240 are needed. The disc 210 with the TDMA is directly loaded into a reference drive in a BD Testing Center or into a drive 160 modified by its manufacturer. As a result, DM mirror files 240, which are a TDMA mirror file and a TDMA access indicators mirror file, are extracted.

When the disc 210 with TDMA is loaded into the drive 140 to be tested, the drive performs the disc closing operation. The disc 210 is closed, and the DMA structure is written to a closed disc 220. Using the closed disc 220 with the DMA, DM mirror files 230, which are a DMA mirror file and a TDMA access indicators mirror file, are generated by the reference drive in the BD Test Center or by the drive 160 modified by its manufacturer. These mirror files 230 conform to a specified file format of the DM mirror file 230. The verifier compares the DM mirror files 230, based on the specification, with pre-extracted DM mirror files 240, according to the "Disc Closing" test and produces a report 190.

Figure 3:
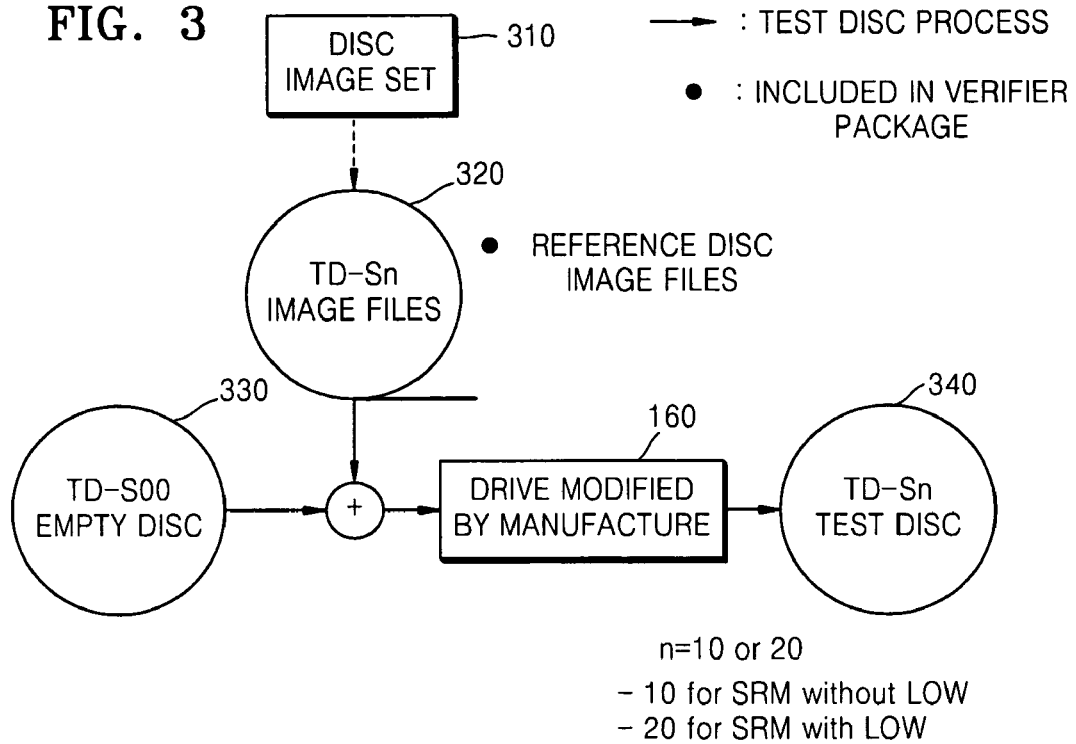
FIG. 3 is a diagram of a test disc preparation system according to an embodiment of the present invention.

FIG. 3 is a diagram of a test disc preparation system according to an embodiment of the present invention. Referring to FIG. 3, before executing a "Reading & Modification" test, a test disc 340 that will be used in the "Reading & Modification" test is made. With a disc image set 310 provided with a verifier package, testers make a TD-Sn (TD-Dn) (n=10 for SRM without LOW, n=20 for SRM with LOW) test disc 340 by recording the contents 320 of image files to a TD-S00 (TD-D00) test disc 330 (a blank disc). In order to make the test disc 340, a drive 160 modified by its manufacturer is used. It is assumed by the specification that since the modified drive 160 can read a disc and extract DM structures as mirror files, the reverse process (making a disc with the disc image set) is also possible with the drive 160. As such, the test disc 340 includes a recorded DM structure that is independent of defects on the test disc 340 and is instead predetermined to match the DM structures in the mirror file(s).

Figure 4:
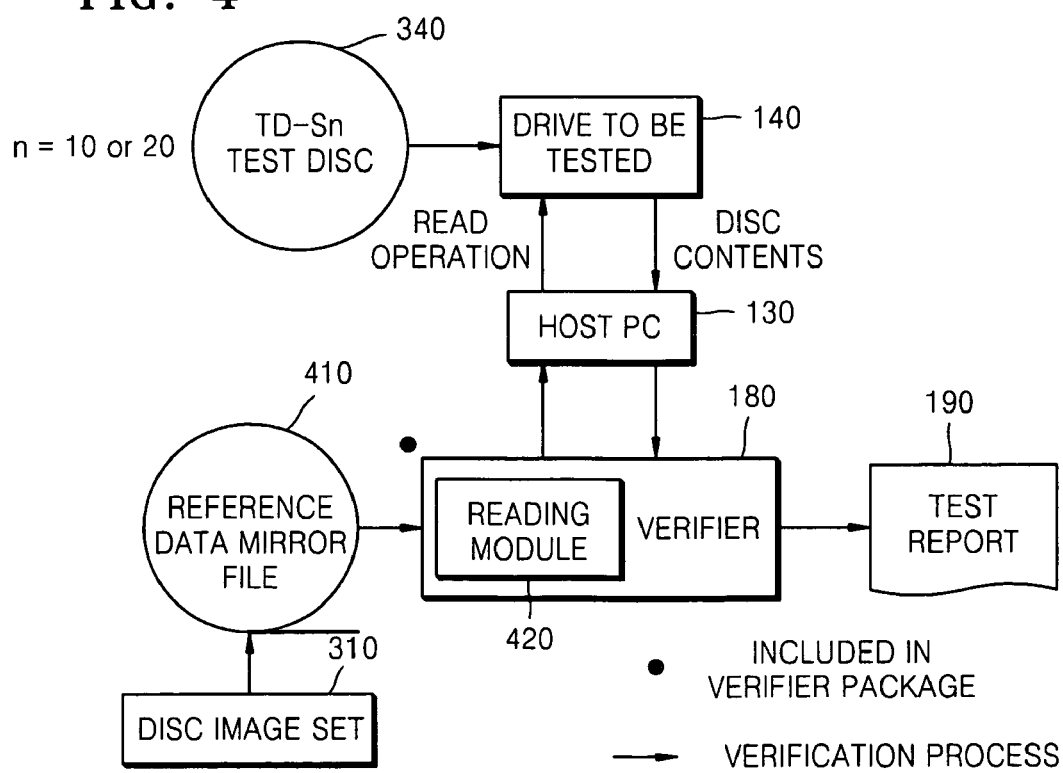
FIG. 4 is a diagram of a reading test system according to an embodiment of the present invention.

FIG. 4 is a diagram of a reading test system according to an embodiment of the present invention. Referring to FIG. 4, the "Reading" test is performed in order to see that the drive 140 to be tested can read properly from a disc. For this purpose, the reading module 420 in the verifier 180, which is specially designed to issue drive-level READ instructions for bypassing a file system layer, is used. In the "Reading Test," a TD-S10 test disc 340 and a TD-S20 test disc 340 is used. When the test disc 340 is loaded into the drive 140, which is to be tested, the reading module 420 in the verifier will send READ instructions to the drive 140 via a host PC 130. Then, the verifier 180 will compare disc contents read from the disc 340 and the reference data mirror file 410 related to the disc image set 310. The disc contents match exactly, except for some implementation-dependent factors. The verifier issues the test report 190 according to the result.

Figures 5, 6:
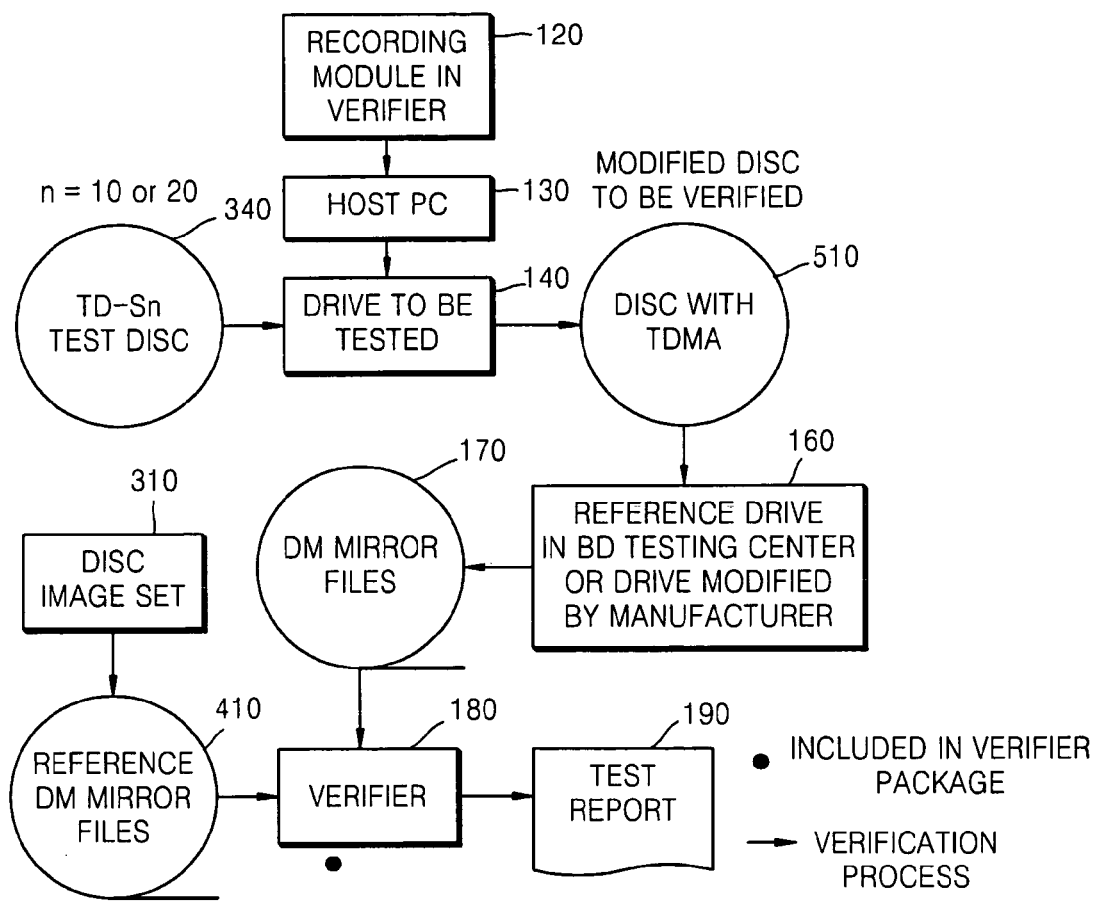
FIG. 5 is a diagram of a modification test system according to an embodiment of the present invention.
FIG. 6 is a table of a structure of a temporary disc management area (TDMA) mirror file according to an embodiment of the present invention.

FIG. 5 is a diagram of a modification test system according to an embodiment of the present invention. Referring to FIG. 5, in a "Modification" test, a TD-S10 (TD-D10) test disc 340 and a TD-S20 (TD-D20) test disc 340 are used as input discs. The goal of the "Modification" test is to verify that the TDMA structure is updated properly as data on the disc 340 is added and modified. When the TD-Sn (TD-Dn) (n=10 for SRM without LOW, n=20 for SRM with LOW) test disc 340 (which can be made by using a modified drive 160 with a TD-S00 (TD-D00) test disc 330, a TD-Sn (TD-Dn) reference mirror file 410, and a TD-Sn (TD-Dn) disc image file 320) is loaded into the drive 140 to be tested, the drive 140 adds and modifies data following a pre-determined scenario by a WRITE AND VERIFY command. The instructions to perform these operations are given by recording module 120 in the verifier 180, which is specially designed to issue drive-level instructions directly to the drive 140, and thereby bypassing the file system layer of the host PC 130. As a result, the disc 510 with a modified TDMA will be generated. Using this disc 510 with the TDMA, DM mirror files 170, which are a TDMA mirror file and a TDMA access indicators mirror file, are generated by the reference drive in the BD Test Center or by a drive 160 modified by its manufacturer. These mirror files 170 conform to a specified file format of the DM mirror file 170. The verification of the DM mirror files 170 with reference DM mirror files 410 is completed based on the specification and detailed check items of the given test scenario (or mode) undergoing the "Reading & Modification" test.

Note that in this case, a DM-off mode is not allowed because modification of data is impossible without a DM, and only a DM-on and LOW-on mode or a DM-on and LOW-off mode is allowed. The DM-on and LOW-on mode means Recording Mode with linear replacement of Defect Management is enabled and LOW is enabled, and a DM-on and LOW-off mode means Recording Mode with linear replacement of Defect Management is enabled and LOW is not enabled.

A disc management (DM) mirror file will now be described in detail. There are three kinds of mirror files: a TDMA mirror file, a TDMA access indicators mirror file, and a DMA mirror file. These files are generated from a disc in order to be verified by a reference drive in a BD Testing Center or by a drive modified by its manufacturer, and are verified in order to verify the drive.

The file format of a TDMA mirror file will now be described. The size of a TDMA mirror file is exactly 5*64*1024 bytes (320 KB) for a single layer (SL) disc and 9*64*1024 bytes (576 KB) for a dual layer (DL) disc. The structure of the TDMA mirror file is shown in FIG. 6 according to an aspect of the invention. A file name can be chosen without any restrictions and the file extension is "tdma". All contents of the file are written as binary code. As shown, the contents include the latest Temporary Defect Management Structure (TDMS), including the latest TDDS, the latest SRRI, and the latest TDFL.

For the purpose of verification, the size of sequential recording range information (SRRI) is fixed by 32 data frames (62 KB). The size of a TDFL in a TDMA mirror file is fixed by 4 clusters on an SL disc and 8 clusters on a DL disc, respectively.

The file format of a TDMA access indicators mirror file will now be described. The size of the TDMA Access Indicators mirror file is exactly 3*64*1024 bytes (192 KB) for the SL disc and 6*64*124 bytes (384 KB) for the DL disc. An example of structure of the TDMA access indicators mirror file is shown in FIG. 7 according to an aspect of the invention. A file name can be chosen without any restrictions and the file extension is "adma". All contents of the file are written as binary code. Every cluster which is unrecorded on the disc is set to 00h. The shown contents include a DMA indicators cluster (and TDMA indicators clusters 1 through n).

The file format of a DMA mirror file will now be described. The size of the DMA mirror file is exactly 4*8*64*1024 bytes (2048 KB) for an SL disc and 4*12*64*1024 bytes (3096 KB) for a DL disc. An example of the structure of the DMA mirror file is shown in FIG. 8 according to an aspect of the invention. A file name can be chosen without any restrictions and the file extension is "dma". All contents of the file are written as binary code. Every cluster which is unrecorded on the disc is set to 00h. The shown contents include DMAs 1 through 4. Each DMA includes a corresponding DDS and SRRI (recorded four times), and a DFL.

A test disc used in aspects of the present invention will now be described in detail. There are five types of test disc for DM verification: the TD-S00 (TD-D00), the TD-S01 (TD-D01) disc, the TD-S02 (TD-D02) 210, the TD-S10 (TD-D10) disc 340, and the TD-S20 (TD-D20) disc 340. If a DM verification process needs to be executed, it is necessary to prepare a special drive 160, which has direct read/write access to a (T)DMA. Also, the TD-S11 (TD-D10)-type test disc 340 and the TD-S20 (TD-D20)-type test disc 340 must be made on a modified drive 160 with the TD-S00 (TD-D00) test disc 330 and a reference disc image set 320.

A TD-S00 disc 330 will now be described in detail. A TD-S00 (TD-D00) disc 330 is a disc designed exclusively for DM verification, particularly for a "Recording Operation" test. The disc itself is generally provided by a BD Testing Center, but can be otherwise provided or defined in other aspects of the invention.

Test items for a TD-S00 (TD-D00) disc 330 are a "Recording" test in a DM-on and LOW-off mode while a "Recording Operation" test is being performed, and a "Recording" test in a DM-on and LOW-on mode while a "Recording Operation" test is being performed.

The TD-S00 (TD-D00) disc 330 is a blank disc with defects on known locations, and may also have some other defects. The defect structure on the known locations is as follows. The TD-S00 (TD-D00) disc 330 of 120 mm (23.3 GB/L) includes 200 defective clusters per layer, and locations of defective clusters are for layers L0 and L1 shown in FIGS. 9A and 9B.

The TD-S00 (TD-D00) 330 of 80 mm (7.8 GB/L) includes 69 defective clusters on layer L0 and 64 defective clusters on layer L1, and locations of defective clusters are shown in FIGS. 9C and 9D.

The TD-Sm (TD-Dm) disc 210 will now be described in detail (m denotes 01 and 02). The TD-Sm (TD-Dm) disc 210 is a disc for DM verification, especially for a "Disc Closing" test performed by drive to be tested for DM verification. The disc itself is made by successfully passing the "Recording" test for each recording mode automatically. In order to execute a DM verification process, it is necessary to prepare a special drive 160, which has direct read access to a TDMA.

The test item for a TD-S01 (TD-D01) disc 210 is a "Disc Closing" test in a DM-on and LOW-off mode undergoing a "Recording Operation" test. The test item for a TD-S02 (TD-D02) disc 210 is a "Disc Closing" test in a DM-on and LOW-on mode under a "Recording Operation" test.

The TD-Sm (TD-Dm) disc 210 contains Temporary Disc Management Structure (TDMS) update units in the TDMAs and data recorded on a data area of the disc 210. The recorded data is from a TD-S00 (TD-D00) disc 110, i.e., "Recording Test" data, which was recorded on it following one of the recording scenarios of a recording module in the verifier 180.

The TD-Sn (TD-Dn) disc 340 will now be described in detail (n denotes 10 and 20). The TD-Sn (TD-Dn) disc 340 is a disc designed for DM verification, especially for a "Reading & Modification" test. The discs 340 themselves are not provided by the BD Testing Center, although the disc can be so provided. Instead, a reference disc image set 310, which consists of a TDMA image file, a TDMA access indicators image file, and a data image file, will be provided with a DM verifier. In order to execute a DM verification process, it is necessary to prepare a special drive 160, which has direct read/write access to the TDMA. Also, a TD-Sn (TD-Dn)-type test disc 340 must be made on a modified drive 160 with a TD-S00 (TD-D00)-type test disc 330 and a reference disc image set 320.

According to an aspect of the invention, the disc image set 320 has a TDMA image file, a TDMA access indicators image file, a data image file, and PSNs for the physical locations on which the data image file will be recorded. The TDMA image file is for pre-fixed TDMS update units in TDMA(s). The TDMA access indicators image file is for TDMA access indicators clusters. The disc image file is for data to be recorded on a data area of a disc. From these files, a disc 340 identical with the original reference disc is created. Disc image sets 320 are included in a DM verifier package. The TDMA access indicators image file can exist only if the size of the TDMA image file is bigger than the size of TDMA0. The contents of image files and the PSNs in a disc image set are used to verify the drive 140 to be tested based on detailed checking items according to a "Reading & Modification" test.

A file format of a TDMA image file will now be described. The size of the TDMA image file is not specified so long as the size complies with test purposes, except that it is M*64 KB (where, M is a positive integer). The structure of the TDMA image file is shown in FIG. 10 according to an aspect of the invention. A file name can be chosen without any restrictions and the file extension is "timg". All contents of the file are written as binary code.

The first 64 KB of the TDMA image file are filled up with the first TDMS update unit, which is a TDMS created by formatting a process for an SRM with all update count fields set to 0. The rest of the TDMA image file is filled up with TDMS update units which includes of all the other TDMS update units from the second TDMS update unit to the latest TDMS update unit. The last 2 KB of the latest TDMS update unit contains the latest TDDS, which contains the latest SRRI pointer, the latest TDFL pointer, and so on. The first TDMS update includes, sequentially, an initialized TDFL, ooh, an initialized SRRI, and an initialized TDDS.

To make the TD-Sn (TD-Dn) disc 340 for the "Reading & Modification" test, the TDMA image file is recorded starting from the first cluster of TDMA0 except indicator clusters, in an ascending order of PSN.

The size of the TDMA access indicators image file is variable up to 2*64 KB for an SL disc, and 5*64 KB for the DL disc. The size depends on the size of the TDMA image file and the allocated status of the TDMA formatting process. In other words, the size of the TDMA access indicators image file is n*64 KB (where n is the number of TDMAs in which the latest TDMS update unit in the TDMA image file will be recorded). The structure of the TDMA access indicators image file is shown in FIG. 11 according to an aspect of the invention. A file name can be chosen without any restrictions while the file extension is "aimg". All contents of the file are written as binary code. Referring to FIG. 11, all 32 data frames in the indicator clusters contain a copy of the first TDDS recorded in the TDMA related to the actual indicator cluster such that there are 32 copies of the TDDS. To make the TD-Sn (TD-Dn) disc 340 for the "Reading & Modification" test, a TDMA access indicators image file is recorded starting from the TDMAn$_{13}$ indicator cluster in an ascending order of PSN, if the file exists in the disc image set 320.

A file format of a disc image file will now be described. The size of the disc image file is not limited or specified as long as the size complies with test purposes, except that the size is N*64 KB (where, N is positive integer). The structure of the disc image file is shown in FIG. 12 according to an aspect of the invention. A file name can be chosen without any restrictions and the file extension is "dimg". All contents of the file are written as binary code.

The first 4 bytes of each data frame (2 KB) of each cluster (64 KB) in the disc image file is filled up with the PSN of a corresponding data frame of the physical cluster on which the cluster is to be recorded, and the rest of the data frame is filled with 00h. This data recording is only for test purposes, in order to see if the drive can read and write data on a disc properly.

To make the TD-Sn (TD-Dn) disc 340 for a "Reading & Modification" test, a disc image file is recorded on the physical cluster defined by PSNs, which are included in a disc image set containing the disc image file 320.

Test items for the TD-S10 (TD-D10) disc 340 are a "Reading" test in DM-on and LOW-off mode under "Reading & Modification" test, and a "Modification" test in DM-on and LOW-off mode under "Reading & Modification" test. Test items for the TD-S20 (TD-D20) disc 340 are a "Reading" test in DM-on and LOW-on mode under "Reading & Modification" test, and a "Modification" test in DM-on and LOW-on mode under "Reading & Modification" test. The TD-S10 (TD-D10) disc 340 contains pre-fixed TDMS update units in TDMAs and data recorded on a data area of the disc. This data is included in the reference disc image set for the TD-S10 (TD-D10) disc 340. The TD-S20 (TD-D20) disc 340 contains pre-fixed TDMS update units in the TDMA, the TDMA access indicator clusters, and data recorded on the data area of the disc. This data is included in the reference disc image set for the TD-S20 (TD-D20) disc 340.

Figure 13:
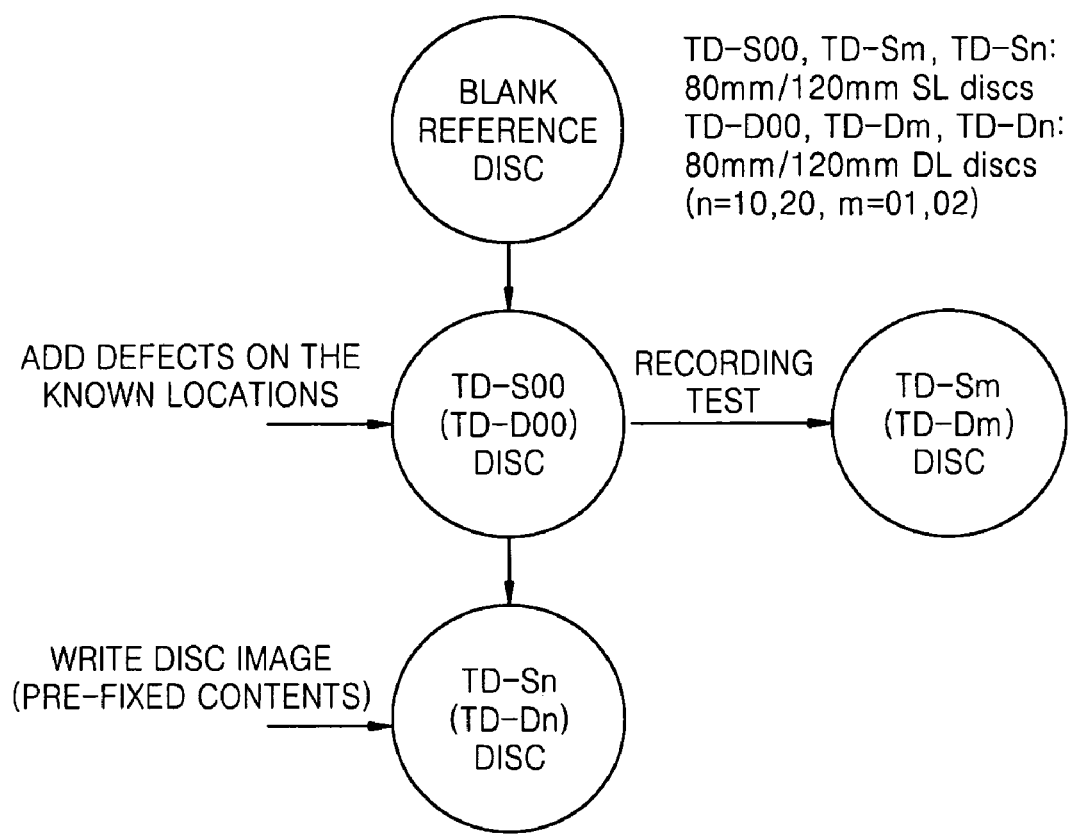
FIG. 13 is a diagram of a test disc status according to an embodiment of the present invention.

FIG. 13 is a diagram of a test disc status according to an embodiment of the present invention. Referring to FIG. 13, the TD-S00 disc 330 has defects on known locations of a blank disc. The TD-S00 disc 330 is provided by the BD Testing Center according to an aspect of the invention. This test disc 330 is used for a "Recording Operation" test. The TD-S00 disc 330 may also have some other defects thereon.

A TD-Sm 210 (m denotes 01 and 02) disc is made by performing a recording test on the TD-S00 disc 330. A TD-S01 disc 210 is made from TD-S00 (D00) 110 which successfully passed the preceding "Recording" test under a DM-on and LOW-off mode. This test disc 210 is used for a "Disc Closing" test under a DM-on and LOW-off mode. This test disc 210 is recorded on the data area based on a recording scenario according to the DM-on and DM-off mode of a recording module 120 in a verifier 180, the contents of the TDMA compliant with the recorded data on the data area, and TDMA access indicators depending on the contents of the TDMA.

The TD-S02 disc 210 is made from TD-S00(D00) 110 which successfully passed the preceding "Recording" test under the DM-on and LOW-on mode. This test disc 210 is used for a "Disc Closing" test under the DM-on and LOW-on mode. Data is recorded on the data area based on a recording scenario according to the DM-on and DM-on mode of a recording module in a verifier, the contents of the TDMA compliant with the recorded data on the data area, and TDMA access indicators depending on the contents of the TDMA.

A TD-Sn disc 340 (n denotes 10 and 20) is made by a disc image recorded on the TD-S00 disc 330. The TD-S10 disc 340 is made by end-users with the TD-S00 (TD-D00) disc 330 and a disc image set 320 according to an aspect of the invention. This test disc 340 is used for "Reading & Modification" test under a DM-on and LOW-off mode. A disc image of a disc image set 320 is recorded on the TD-S10 disc 340 according to the DM-on and LOW-off mode in a verifier.

The TD-S20 disc 340 is made by end-users with the TD-S00 (TD-D00) disc 330 and a disc image set 320 according to an aspect of the invention. This test disc 340 is used for a "Reading & Modification" test under the DM-on and LOW-on mode. A disc image 320 of a disc image set is recorded on the TD-S20 disc 340 according to the DM-on and LOW-on mode in the verifier.

The TD-S00 disc 110/330, the TD-Sm disc 210, and the TD-Sn disc 340 are 80 mm/120 mm single layer discs. The TD-D00 disc 110/330, the TD-Dm disc 210, and the TD-Dn disc 340 are 80 mm/120 mm dual layer discs. However, it is understood that additional layers can be used.

FIG. 14 is a table of test modes according to an embodiment of the present invention. Referring to FIG. 14, test modes for a "Recording Operation" test and a "Reading & Modification" test on both a DM-on and LOW-off condition and a DM-on and LOW-on condition are provided. The "Recording Operation" test on each recording mode includes a "Recording" test and a "Disc Closing" test. The "Reading & Modification" test on each recording mode includes a "Reading" test and a "Modification" test.

A test process for the test disc and checking items according to aspects of the present invention will now be described. FIG. 15 is a table of checking items and test processes according to an embodiment of the present invention. Referring to FIG. 15, a recording test of a recording operation test on DM-on and LOW-off modes checks whether a TDMA structure complies with the standard, TDMA access indicators comply with the standard, whether TDFL contains TDFL entries (which were generated by known defects based on recording locations of a test scenario) and whether SRRI entries recorded based on a recording scenario comply with the standard.

A disc closing test of the recording operation test on the DM-on and LOW-off modes checks whether a DMA structure complies with the standard, the TDMA access indicators comply with the standard, and whether DMS is identical to the latest TDMS.

A reading test of a reading & modification test on the DM-on and LOW-off modes checks whether data conforms to the TDFL entries.

A modification test of the reading & modification test on the DM-on and LOW-off modes checks whether a TDMA structure complies with the standard, whether the TDMA access indicators comply with the standard, whether the TDFL contains the TDFL entries (which were generated by known defects based on recording locations of the test scenario) and whether SRRI entries comply with a recorded status based on the recording scenario.

A recording test of a recording operation test on DM-on and LOW-on modes checks whether a TDMA structure complies with the standard, whether TDMA access indicators comply with the standard, whether TDFL contains TDFL entries (which were generated by known defects and/or LOW based on recording locations of a test scenario) and whether SRRI entries comply with a recorded status based on a recording scenario.

A disc closing test of the recording operation test on the DM-on and LOW-on modes checks whether a DMA structure complies with the standard, the TDMA access indicators comply with the standard, and whether a DMS is the same as the latest TDMS.

A reading test of a reading & modification test on the DM-on and LOW-on modes checks whether data conforms to TDFL entries.

A modification test of the reading & modification test on the DM-on and LOW-on modes checks whether a TDMA structure complies with the standard, the TDMA access indicators comply with the standard, whether the TDFL contains the TDFL entries (which were generated by known defects and/or LOW based on recording locations of the test scenario), and whether SRRI entries comply with a recorded status based on the recording scenario.

Figure 16:
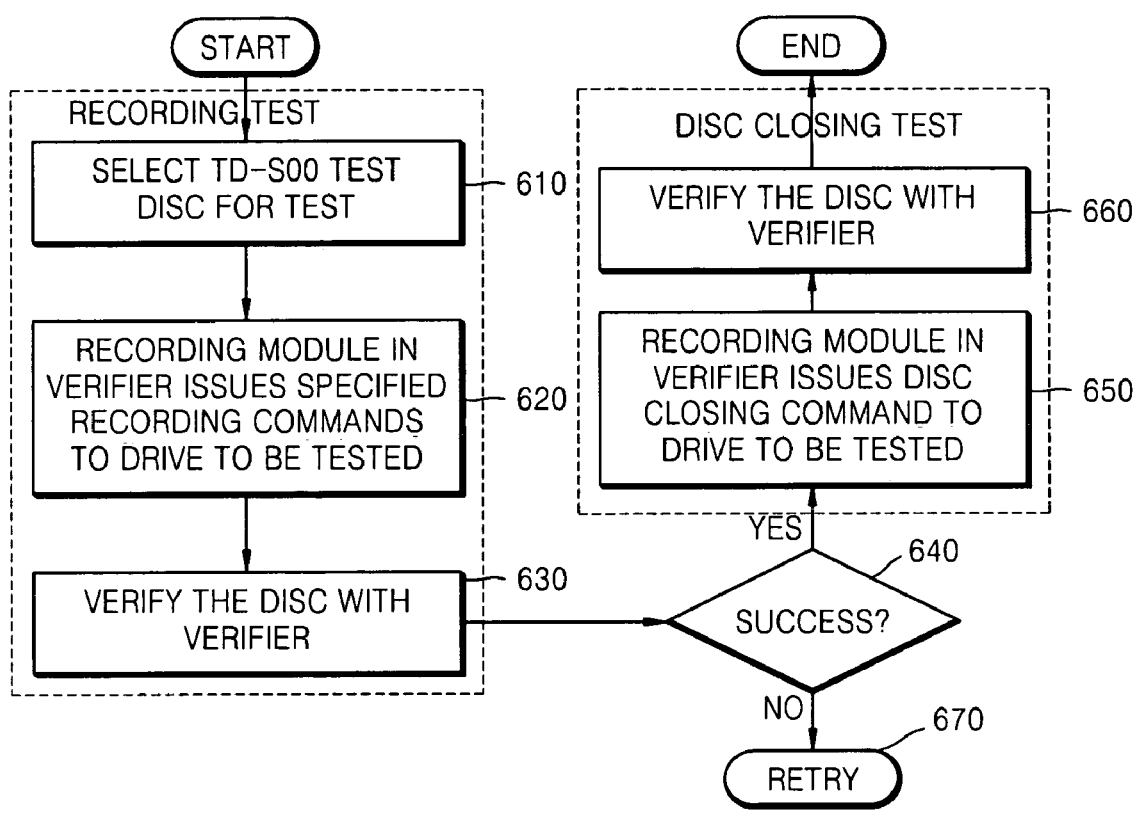
FIG. 16 is a flowchart of a method of verifying a recording operation test according to an embodiment of the present invention.

FIG. 16 is a flowchart of a method of verifying a recording operation test according to an embodiment of the present invention. A TD-S00 (TD-D00) test disc 110 is used for a "Recording" test in both recording modes (SRM with LOW and SRM without LOW) (Operation 610). For the "Recording" test on each recording mode, as the TD-S00 (TD-D00) test disc 110 is loaded into the drive 140 to be tested, the recording module 120 in the verifier 180 will issue specified recording commands based on a test scenario to the drive 140 to be tested (Operation 620). By these specified recording commands, the drive 140 to be tested formats the disc 110 in a given recording mode and records specified data on the disc 110 during the recording mode. As a result, the drive 140 to be tested generates a disc 150 to be verified with a TDMA.

Finally, the DM verifier 180 verifies the disc to be verified with a TDMA by using DM mirror files (a TDMA mirror file and a TDMA access indicators mirror file), which are extracted from the disc 150 by a reference drive 160 in a BD Test Center or by a drive 160 modified by its manufacturer (Operation 630).

According to an aspect of the invention, a test scenario according to each recording mode is designed to verify the following items:

A replacement for known defects

A replacement for LOW on Open sequential recording range (SRR) entry (only in the case of an SRM with LOW)

A replacement for LOW on Closed SRR entry (only in the case of an SRM with LOW)

SRR entries with status Open

SRR entries with status Closed

Multi session recording (only in the case of an SRM without LOW)

A disc closing test will now be described. First it is determined whether a TD-Sm (m denotes 01 and 02) test disc 210 successfully passes the recording test (Operation 640). If the TD-Sm test disc 210 does not successfully pass the recording test, a new disc is tried (Operation 670). If the TD-Sm 210 successfully passes the recording test, the TD-Sm test disc 210 is used for a "Disc Closing" test.

For the "Disc Closing" test, a reference drive 160 in a BD Test Center or a drive 160 modified by its manufacturer extracts DM mirror files 240 (a TDMA mirror file and a TDMA access indicators mirror file) from the TD-Sm (TD-Dm) 240. Then, with the TD-Sm(TD-Dm) test disc 210 loaded into the drive 140 to be tested, a recording module 120 in a verifier 180 issues commands for closing the disc 210 (Operation 650). By these commands, the drive 140 to be tested closes the disc 210. As a result, the drive 140 to be tested generates a disc 140 to be verified with a DMA 220. Finally, a DM verifier 180 verifies the disc 220 to be verified with a DMA by using DM mirror files 230 (a DMA mirror file and a TDMA access indicators mirror file) which are extracted from the disc 230 by reference drive 160 in a BD Test Center or by a drive 160 modified by its manufacturer (Operation 660). A test scenario according to each recording mode is designed for the drive to be tested so as not to record some data on the user data area. In other words, this means that the test scenario is only about closing the disc 210.

Figure 17:
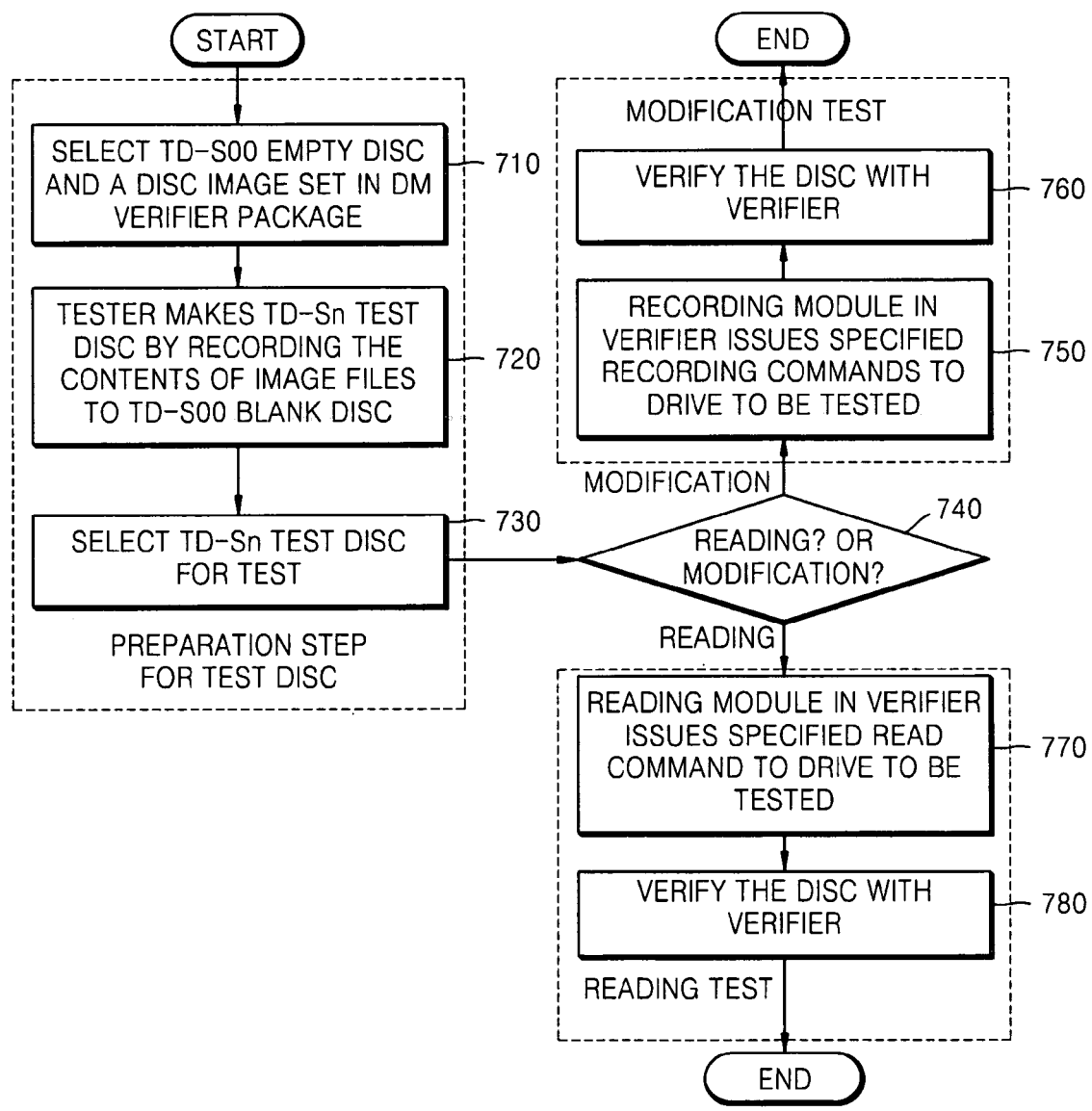
FIG. 17 is a flowchart of a method of verifying a reading and modification test according to an embodiment of the present invention.

FIG. 17 is a flowchart of a method of verifying a reading and modification test according to an embodiment of the present invention. Referring to FIG. 17, for a "Reading & Modification" test, testers make the TD-Sn 340 (TD-Dn) test disc (Operation 720) using their own modified drive by selecting a TD-S00 (TD-D00) empty disc 330 and a disc image set 320 (Operation 710) which is designed for this test in each recording mode included in a DM verifier package and select a TD-Sn test disc 340 for the "Reading & Modification" test (Operation 730). For verification purposes, a disc image set 320 and a test scenario for this test is designed for a disc after a "Modification" test in order to have updated indicator clusters.

When the test disc 340 is prepared, either the reading test or the modification test is selected (Operation 740). If the reading test is selected, a TD-Sn test disc 340 is used for a "Reading" test. For the "Reading" test, as the TD-Sn (TD-Dn) test disc 340 is loaded into the drive 140 to be tested, a reading module 420 in a verifier 180 issues specific commands to read the contents of a user data area to the drive 140 to be tested (Operation 770). By these specific commands, the drive 140 to be tested reads the contents based on the latest TDFL and sends the contents from the disc 340 to a DM verifier 180 through a host PC 130. Finally, the DM verifier 180 verifies the contents from the disc 340 (Operation 780). Disc image sets 320 for the "Reading" test are designed in order to verify data reading based on DFL entries created by defects and LOW. By comparing the reference data mirror file 410 with data read from the test disc 340 by the drive 140 to be tested, the DM verifier 180 may check indirectly if the drive 140 to be tested read the latest TDMS correctly. This result is output in the test report 190.

The Modification test will now be described. The TD-Sn test disc 340 is used for a "Modification" test. For the "Modification" test in each recording mode, as the TD-Sn (TD-Dn) test disc 340 is loaded into the drive 140 to be tested, the recording module 120 in the verifier 180 issues specific recording commands based on the test scenario to the drive 140 to be tested (Operation 750). By these specific recording commands, the drive 140 to be tested records specific data on the disc 340 in the predetermined recording mode of the disc 340. As a result, the drive 140 to be tested generates a disc 510 to be verified with a TDMA. Finally, the DM verifier 180 verifies the disc 510 to be verified with the TDMA by using DM mirror files 170 (a TDMA mirror file and a TDMA access indicators mirror file), which are extracted from the disc 510 by the reference drive 160 in the BD Test Center or by the drive 160 modified by its manufacturer (Operation 760). This comparison is output in the test report 190.

A test scenario according to each recording mode is designed to verify the following:

A replacement for known defects

A replacement for LOW on Open SRR entry (only in the case of an SRM with LOW)

A replacement for LOW on Closed SRR entry (only in the case of an SRM with LOW)

SRR entries with status Open

SRR entries with status Closed

Multi session recording (only in the case of an SRM without LOW)

Whether a drive to be tested updates the TDMA access indicator

A detailed checklist for disc management verification will now be described.

TDMA access Indicators Verification

To quickly find out which TDMA is currently in use, the first clusters of TDMA0 are used as indicators. Moreover, to quickly find out the location of a TDMA which is currently in use, TDMA access indicator clusters contain the TDDS. For robustness and while not required in all aspects, all 32 data frames in the indicator clusters contain a copy of the TDDS such that there are 32 copies of the TDDS. Accordingly, FIG. 18 is a table of a checklist for TDMA access indicators verification according to an embodiment of the present invention. Referring to FIG. 18, the checklist for TDMA access indicators includes a location of the indicator clusters, a marked status of the indicator clusters, an error condition of the indicator clusters, contents of the indicator clusters, an unused area, and integrity of the indicator clusters.

According to an aspect of the invention, expected values of the location of the indicator clusters are 00 0E E0 00h-00 0E E0 5Fh in a single layer and DL: 00 0E E0 00h-00 0E E0 BFh in a dual layer. If all the indicator clusters are unrecorded, then the location is defined as is currently in use for the latest TDMS.

The marked status of the indicator clusters indicate a TDMA which is currently in use.

An expected value of the error condition of the indicator clusters is "no uncorrectable error". For verification purposes, in the case that one or more clusters are recorded, there are no uncorrectable errors in each indicator Cluster. If an uncorrectable error is found, then the verification fails and a new disc 340 is used in order to retry the test.

The contents of the indicator clusters are 32 couples of TDDS. All 32 data frames in each indicator cluster contain a copy of the TDDS if the cluster is recorded.

The unused area is unrecorded.

Concerning the integrity of the indicator clusters, the pointers for the TDFL and SRRI in the latest TDDS are in the TDMA which the indicator clusters indicate.

TDMA Verification

For the SL disc, the TDMA is located in the lead-in zone and called TDMA0. For the DL disc, there are two same TDMAs, TDMA0 in the Lead-in Zone of layer 0 and TDMA1 in the lead-out zone of layer 1. Both TDMA0 and TDMA1 have a fixed size of 2048 physical clusters. The locations and sizes for additional TDMAs are dependent on the initialization status of a BD-R disc. The temporary disc management structure (TDMS) in this document includes a temporary disc definition structure (TDDS), a temporary defect list (TDFL), and sequential recording range information (SRRI). For verification purposes, this document verifies the latest TDMS, which most accurately reflects the current status of the disc. The latest TDMS is verified for a "Recording" test and a "Modification" test according to each recording mode.

FIG. 19 is a table of a checklist for TDMA verification according to an embodiment of the present invention. Referring to FIG. 19, the checklist for TDMA verification includes a location of TDMAs, a location of the latest TDDS, an error condition of the latest TDDS, an error condition of the latest TDFL, an error condition of the latest SRRI, additional TDMA_size fields in the latest TDDS, pointers for TDFL in the latest TDDS, and a pointer for SRRI in the latest TDDS.

In the location of the latest TDDS, the TDMAs are used sequentially in the following order. For an SL disc: TDMA0→TDMA1→TDMA2 (size of TDMA1 and/or TDMA2 can be equal to 0); and for a DL disc: TDMA0→TDMA1→TDMA2→TDMA3→TDMA4→TDMA5 (size of TDMA2 and/or size of TDMA3&4 and/or size of TDMA5 can be equal to 0).

The expected value of the location of the latest TDDS is the last data frame of the last of the clusters constituting a TDMS. The latest TDFL and the latest SRRI are pointed to by the latest TDDS.

Concerning the error condition of the latest TDDS, for verification purposes, there are no uncorrectable errors in the cluster, which contains the latest TDDS. If an uncorrectable error is found, then the verification fails and a new disc is used to retry the test.

Concerning the error condition of the latest TDFL, for verification purposes, there are no uncorrectable errors in the clusters, which contain the latest TDFL. If an uncorrectable error is found, then the verification fails and a new disc is used to retry the test.

Concerning the error condition of the latest SRRI, for verification purposes, there are no uncorrectable errors in the clusters, which contain the latest SRRI. If an uncorrectable error is found, then the verification fails and a new disc is used to retry the test.

Additional TDMA_size fields in the latest TDDS are the same as those of the indicator clusters.

Concerning pointers for TDFL in the latest TDDS and a pointer for SRRI in the latest TDDS, the latest TDMS (which has the latest TDDS, the latest TDFL, and the latest SRRI) is in one TDMA.

DMA Verification

The DMA is verified by a "Disc Closing" test. By closing the disc, the latest TDMS except a "first PSN of Defect List" field in the TDDS is copied into the four DMAs 1, 2, 3 and 4, in order to describe the exact status of the disc at the moment of closing.

FIG. 20 is a table of a checklist for DMA verification according to an embodiment of the present invention. Referring to FIG. 20, the checklist for DMA verification includes the location of DMAs 1, 2, 3 and 4, an error condition of 16 DDS, DDS update count, contents of 4 DDS1 in DMA1, contents of 4 DDS2 in DMA2, contents of 4 DDS3 in DMA3, contents of 4 DDS4 in DMA4, an error condition of 4 DFL, DFL update count, and contents of 4 DFL. Concerning a location of DMAs 1, 2, 3 and 4, all clusters of the first 4 clusters of each DMA contain DDS+SRRi.

Error condition of 16 DDS: for verification purposes, there are no uncorrectable errors in DDS. If an uncorrectable error is found, then the verification fails and a new disc is used to retry the test.

DDS update count: all 16 DDS update counts have the same value for verification purposes.

Contents of 4 DDS1 in DMA1: all contents of 4 DDS1 are the same for verification purposes.

Contents of 4 DDS2 in DMA2: all contents of 4 DDS2 are the same for verification purposes.

Contents of 4 DDS3 in DMA3: all contents of 4 DDS3 are the same for verification purposes.

Contents of 4 DDS4 in DMA4: all contents of 4 DDS4 are the same for verification purposes.

That is, all contents in sixteen DDSs must be identical to each other for the verification purpose except the first PSN field of a defect list of each DDS.

Error condition of 4 DFL: for verification purposes, there are no uncorrectable errors in the DFL. If an uncorrectable error is found, then the verification fails and the test is retried by using a new disc.

DFL update count: all 4 DFL update counts have the same value for verification purposes.

Contents of 4 DFL: all contents of 4 DFL are the same for verification purposes.

TDDS & DDS Verification

The latest TDDS is verified for a "Recording" test and a "Modification" test, according to each recording mode. The DDS is verified for a "Disc Closing" test. Contents of the DDS are the same as those of the latest TDDS except for a "First PSN of Defect List" field. FIGS. 21A through 21C are tables of a checklist for TDDS verification according to an embodiment of the present invention. Referring to FIG. 21A through 21C, the checklist for TDDS verification includes the following items:

TDDS identifier.

TDDS format.

TDDS update count: $1 \leq N$ for a "Recording" test, $k+1 \leq N$ for a "Disc Closing" test and a "Modification" test (k: previous value).

First PSN of drive area: 0 or First PSN of a cluster within drive area(s).

Drive area on layer 0: 00 0F. E4 00h~00 0F F3 FFh, drive area on layer 1: 01 F0 0C 00h~01 F0 1B FFh.

First PSN of defect list: this field is set to 00h in all TDDS sectors appearing in the TDMAs. When the disc is closed and the final DDS is written in the DMA, this field specifies the first PSN of the first DFL that can be retrieved error free in the DMA zone containing the particular DDS. If no defect list can be stored error free, this field is set to FF FF FF FFh.

Location of LSN 0 of user data area: 00 10 00 00h+ 32*ISA0_size. For verification purposes, ISA0_size=4096.

Last LSN of user data area: for an SL disc: 32*(N_CL–ISA0_size–OSA_size)–1. For a DL disc: 32*(2*N_CL–ISA0_size–2*OSA_size–ISA1_size)–1.

SA size: byte 40 to 43: ISA0_size=4096; Byte 44 to 47: OSA_size=N*256 ($0 \leq N \leq 64$ for SL disc and $0 \leq N \leq 32$ for DL disc); Byte 48 to 51: ISA0_size=K*256 (K=0 for SL disc and $0 \leq K \leq 64$ for DL disc).

Spare area full flags:

b7 to b4: reserved;

b3: Inner spare area 1 full flag;

b2: Outer spare area 1 full flag;

b1: Outer spare area 0 full flag;

b0: Inner spare area 0 full flag.

For b3 to b0, for each bit, if the bit is set to 0, then spare clusters are available for replacement and for the rest, no spare clusters are available for replacement.

On SL disc, bits b3 and b2 are set to 0.

Pre-write Area flags: this field is not checked for verification purposes.

Status bits of PAC locations: this field is not checked for verification purposes.

Recording Mode: b2 to b7 are reserved areas when b1=0: LOW off, b1=1: LOW on, b0=0: SRM, and b0=1: RRM.

General flag bits: b1 to b7 are reserved areas when b0=0: Write protection off, b0=1: Write protection on. For verification purposes, this field is set to 00h.

Inconsistency flags: byte 1026: bit7 to b3: reserved; bit2: LRA IC_flag; bit1: SRRI IC_flag; bit0: TDFL IC_flag. If this field is not set to 00h, then verification fails and the test is retried by using a new disc.

Last recorded address of user data area,

TDMA sizes in SAs (define SA).

Next available PSNs of Test Zone: byte 1088 to 1091: P_TZ0, byte 1092 to 1095: P_TZ1. Each field specifies the first PSN of the next usable cluster available for testing and OPC procedures in the Test Zone. P_TZ0 equals the first PSN of a cluster within the test zone on layer L0 (00 0D E0 00h~00 0E DF 7Fh) or FF FF FF FFh. P_TZ1 equals the first PSN of a cluster within the test zone on layer L1 (01 F2 F0 00h~01 F3 EF FFh) or FF FF FF FFh. For an SL disc, P_TZ1=00 00 00 00h.

Next available PSNs of DCZ: byte 1104 to 1107: P_TZ0, byte 1108 to 1111: P_TZ1. Each field specifies the first PSN of the next usable cluster available for drive calibration procedures in the drive calibration zone. P_CZ0 equals the first PSN of a cluster within the test zone on layer L0 (00 BD C3 E0h~00 BE 03 DFh) or FF FF FF FFh. P_CZ1 equals the first PSN of a cluster within the test zone on layer L1 (01 41 FC 20h~01 42 3C 1Fh) or FF FF FF FFh. For an SL disc, P_CZ1=00 00 00 00h.

First PSN of nth Cluster of Defect List: each field indicates the first PSN of the nth cluster of the latest TDFL. All PSNs, which are set at these fields, are PSNs in the same TDMA #. When there is no nth cluster of the latest TDFL, a P_nth DFL is set to 00 00 00 00h.

First PSNs of SRRI/SBM: byte 1184 to 1187: P_SRR (This field indicates the PSN of first sector of the latest SRRI). The PSN is a PSN in a TDMA. Byte 1188 to 1191: 00h for verification purposes.

Next available PSNs of SA: each field indicates the first physical sector number of the next usable spare cluster in the SA. When an SA_size equals 0, the field is set to 00 00 00 00h. When as SA has no free spare clusters, the field is set to FF FF FF FFh.

Year/Month/Date of recording: this field is not checked for verification purposes.

Drive ID: Manufacture Name/Additional ID/Unique Serial Number: this field is not checked for verification purposes.

Integrity of TDDS: P_nth DFL and P_SRR are in the TDMA which the marked status of indicator clusters indicates.

TDFL & DFL Verification

The latest TDFL is verified for a "Recording" test and a "Modification" test according to each recording mode. DFL is verified for a "Disc Closing" test. Contents of a DFL are the same as those of the latest TDFL. FIG. 22 is a table of a checklist for TDFL verification according to an embodiment of the present invention. Referring to FIG. 22, the checklist for TDFL verification includes the following:

DFL identifier.

DFL format.

DFL Update Count: this field specifies the total number of update operations of the defect list.

Number of DFL entries: this field specifies the total number of DFL entries.

Number of RAD/CRD entries: this field specifies the total number of DFL entries with Status 1=0000b or 1000b.

Number of NRD entries: this field specifies the total number of DFL entries with Status 1=0001b.

DFL entries: dependent on each verification mode, DFL entries are checked to determine if known defects and/or LOW caused them.

DFL terminator: b32 to b63 indicate DFL terminators and b0 to b31 are the same as DFL update count.

Integrity of DFL: the DFL entries are sorted in ascending order as if each entry were a single 64-bit unsigned integer of which the msb is ignored (always supposed to be 0), which means the DFL entries are first sorted by Status 1, and within Status 1 by a defective cluster first PSN, and within a defective cluster first PSN by Status 2, and within Status 2 by a replacement cluster first PSN.

SRRI Verification

The latest SRRI is verified for a "Recording" test and a "Modification" test according to each recording mode. The SRRI in a DMA is verified for a "Disc Closing" test. Contents of SRRI in the DMA are the same as those of the latest SRRI. FIG. 23 is a table of a checklist for SRRI verification according to an embodiment of the present invention. Referring to FIG. 23, the checklist for SRRI verification includes the following items:

SRRI identifier.

SRRI format.

SRRI Update Count: this field specifies the total number of update operations of the SRRI structure.

Number of SRR entries: this field indicates the total number of SRR entries.

Number of Open SRRs: this field indicates the number of SRRs with status open.

List of Open SRR numbers: this field indicates all SRR numbers with status Open.

SRR entries: dependent on each recording scenario, propriety of SRR entries are checked.

SRR terminator: b32 to b63 indicate DFL terminators and b0 to b31 are same as SRRI update count.

Integrity of SRRI: the SRR entries are sorted in ascending order by "Start PSN of the SRR #I" field.

DM Verification

Contents of items for a write test and a modification test are illustrated in FIGS. 24A and 24B. Test items for the TDMA access indicator are mark state, error condition of indicator cluster, contents of indicator cluster, unused area, and integrity.

Marked State: The number of written indicator clusters must be identical to the number of TDMs being used. After the modification test, the mark state must indicate one of next TDMSs of a TDMA indicating the disc image set.

Error Condition of Indicator Cluster: An uncorrectable error is not allowed.

Contents of Indicator Cluster: All 32 data frames must include copy of TDDS.

Integrity: Pointers of TDFL and SRRI of a last TDDS must be included in a TDAM indicated by the indicator cluster.

Test items for the latest TDDS are as follows:

TDDS identifier.

TDDS update count: this field specifies the total number of update operations on TDDS. $1 \leq N$ for a "Recording" test, $k+1 \leq N$ for a "Modification" test (k: update count of the latest TDDS in disc image set).

First PSN of Drive Area: 0 or first PSN of a cluster within drive area(s); drive area on layer 0: 00 0F. E4 00h~00 0F F3 FFh; and drive area on layer 1: 01 F0 0C 00h~01 F0 1B FFh.

First PSN of defect list.

Location of LSN 0 of user data area: 00 10 00 00h+ 32*ISA0_size.

Last LSN of user data area: For an SL disc: 32*(N_CL−ISA0_size−OSA_size)−1; and for a DL disc: 32*(2*N_CL−ISA0_size−2*OSA_size−ISA1_size)−1.

Inner spare area 0 size: 00 00 10 00h.

Outer spare area 1 size: this field is set to N*256. (0: $N \leq 64$ for an SL disc and $0 \leq N \leq 32$ for a DL disc).

Inner spare area 1 size: this filed is set to K*256. (K=0 for an SL disc and $0 \leq K \leq 64$ for a DL disc).

Spare area full flags: depend on allocated SAs and number of replacement clusters by defect.

Recording Mode: b1=0 for LOW-off, b1=1 for LOW-on.

General flag bits: for verification purposes, this field is set to 00h.

Inconsistency flags: for verification purposes, LRA, SRRI, and TDFL are consistent. If this field is not be set to 00h, then verification fails and the test is retried by using a new disc.

LRA (last recorded address) of user data: this field indicates the real LRA for verification purposes.

TDMA sizes in SAs: TDMA in ISA0=m*256 ($0 \leq m \leq 16$), TDMA in OSA=n*256 ($0 \leq n \leq N$), and TDMA in ISA1=k*256 ($0 \leq k \leq K$).

DFL pointers: the nth field specifies the first PSN of the nth cluster of the latest TDFL. All PSNs, which are set at these fields, are PSNs in the same TDMA #. When there is no nth cluster of the latest TDFL, a P_nth DFL is set to 00 00 00 00h.

SRRI pointer: this field specifies the PSN of the first sector of the latest SRRI. The PSN, which is set at this field, is a PSN in a TDMA.

Next available PSNs of SAs: these fields indicate the first physical sector number of the next usable spare cluster in SAs.

Integrity of TDDS: DFL pointers and an SRRI pointer are in the TDMA which indicator clusters indicate.

The test items for the latest TDFL are as follows:

DFL identifier.

DFL Update Count: this field specifies the total number of update operations of the defect list. $1 \leq N$ for a "Recording" test, $k+1 \leq N$ for a "Modification" test (k: update count of the latest TDFL in a disc image set).

Number of DFL entries.

Number of RAD/CRD entries: this field specifies the total number of RAD+CRD (each start and each end are counted separately as one entry) entries in the DFL.

Number of NRD entries: this field specifies the total number of NRD entries in the DFL.

Integrity of DFL entries: the compliance of DFL entry format is checked. The TDFL contains DFL entries, which were generated by known defects and/or LOW according to recording locations of a test scenario.

DFL terminator: b32 to b63: RBP are checked.

b0 to b31 are the same as DFL update count.

Blank area: No blank area between entries.

Integrity of DFL: a sorting order: refer to FIG. 22. N_DFL, N_RAD/CRD, N_NRD: the real number of entries of each type are matched with a value of the field.

The test items for the latest SSRI are as follows:

SRRI identifier.

SRRI format.

SRRI update count: this field specifies the total number of update operations of the latest SRRI. $1 \leq N$ for a "Recording" test. $k+1 \leq N$ for a "Modification" test (k: update count of the latest SRRI in a disc image set).

N_SRR: this field specifies the total number of the SRR entries in the SRRI.

Number of open SRRs: this field specifies the number of SRRs with status Open. The maximum value of this field is 16.

List of Open SRR numbers: this field indicates all SRR numbers with status Open.

Integrity of SRR entries: the compliance of the SRR entry format is checked. The SRRI contains SRRI entries, which were generated by a test scenario.

SRR terminator: b32 to b63: PBP is checked. b0 to b31 are set to SRRI update count.

Integrity of SRRI: SRR entries are sorted in ascending order by "Start PSN" field.

FIG. 25 is a table of contents of items for a disc closing test according to an embodiment of the present invention. Referring to FIG. 25, TDMA access indicators use a marked status, the error condition of an indicator cluster, contents of the indicator cluster, and an unused area as test items.

Marked status: all indicator clusters are recorded to an indicator DMA.

Contents of the indicator cluster: all 32 data frames contain a copy of the TDDS.

Test items for DDS are the same as the latest TDDS.

Test items for DFL are the same as the latest TDFL.

Test items for SRRI are the same as the latest SRRI.

The latest TDMS at the moment of closing is generated by a DM verifier 180 with the TDMA mirror file 230 which was extracted from TD-Sm (TD-Dm) disc 220.

FIG. 26 is a table of contents of items for a reading test according to an embodiment of the present invention. Referring to FIG. 26, items for the reading test are as follows:

Disc contents: a DM verifier 180 generates a reference data mirror file 410 from the disc image set 310. By this verification mode, it can be determined whether the drive to be tested reads requested data based on TDFL entries.

The latest TDFL: indirect checking is performed by comparing contents of replacement clusters with data read from the test disc by the drive 140 to be tested.

While not required in all aspects, aspects of the present invention can also be embodied as computer readable code on one or more computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed network coupled computer systems so that the computer readable code is stored and executed in a distributed fashion. Also, functional programs, code and code segments for accomplishing the present invention can be easily construed by programmer skilled in the art to which the present invention pertains.

As described above, aspects of the present invention provide a method and apparatus for verifying whether a recording/reproducing apparatus properly produces disc management information and records the disc management information on a disc.

While a few embodiments of the present invention have been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A method of verifying whether a recording and/or reproducing apparatus that records/reproduces a disc properly performs reading and modification operations, the method comprising:

loading a prepared test disc in the recording/reproducing apparatus to be tested, the test disc including a predetermined temporary disc management area (TDMA) structure for use in managing defects prior to finalization of the test disc;

issuing read commands to the recording/reproducing apparatus to be tested on which the test disc is loaded to read the test disc and verifying the TDMA structure read from the test disc in order to verify a read operation of the apparatus; and issuing write commands to the recording/reproducing apparatus to be tested on which the test disc is loaded such that the recording/reproducing apparatus records data on the test disc having the TDMA structure, and checking whether the TDMA structure is properly updated on the test disc in order to verify a modification operation of the apparatus;

wherein the checking of whether the TDMA structure is properly updated on the test disc in order to verify the modification operation of the apparatus further comprises verifying a TDMA access file indicator of the test disc.

2. The method of claim 1, wherein the TDMA is in addition to a defect management area (DMA) in which temporary defect management information in the TDMA is copied when the test disc is finalized.

3. The method of claim 1, wherein the test disc is a write once recording medium.

4. The method of claim 3, wherein the test disc is a Blu-ray (BD-R) disc.

5. The method of claim 4, wherein the TDMA is in addition to a defect management area (DMA) in which temporary defect management information in the TDMA is copied when the test disc is finalized.

6. The method of claim 1, wherein:

the verifying the TDMA structure of the test disc in order to verify the read operation of the apparatus comprises comparing the read TDMA structure with a TDMA reference mirror file, and the TDMA reference mirror file has a copy of the predetermined TDMA structure.

7. The method of claim 1, wherein:

the verifying the TDMA structure of the test disc in order to verify the modification operation of the apparatus comprises comparing the TDMA structure of the test disc after the recording is performed with a TDMA reference mirror file; and the TDMA reference mirror file has a copy of the predetermined TDMA structure updated according to the modification operation.

8. The method of claim 7, wherein the issuing the write commands comprises issuing write commands which, if the recording and/or reproducing apparatus to be tested properly records data on the test disc having the TDMA structure, results in the updated TDMA structure which matches the TDMA reference mirror file.

9. The method of claim 1, wherein the test disc is a single layer disc having a single recording layer.

10. The method of claim 1, wherein the test disc is a multi-layer disc having recording layers.

11. The method of claim 1, wherein the verifying the TDMA access file indicator of the test disc comprises comparing the TDMA access file indicator with a reference mirror TDMA access file indicator file.

12. An apparatus for verifying whether a recording/reproducing apparatus that records and/or reproduces a disc properly performs reproducing and modification operations, the apparatus comprising:

a reading module to issue read commands to a recording/reproducing apparatus to be tested on which a test disc is loaded to reproduce data from the test disc in accordance with a predetermined temporary disc management area (TDMA) structure during a reproducing operation, the predetermined TDMA structure being for use in managing defects on the test disc prior to finalization of the test disc;

a reading module verifier which verifies the TDMA structure read from the test disc in order to verify the read operation of the apparatus to be tested;

a recording module to issue write commands to the recording and/or reproducing apparatus to be tested on which the test disc is loaded to record and/or modify data on the test disc such that the predetermined TDMA structure is updated; and a recording module verifier which checks whether the TDMA structure is properly updated on the disc in order to verify the recording and/or modification operation of the apparatus to be tested;

wherein the recording module verifier checks whether the TDMA structure is properly updated on the test disc in order to verify the modification operation of the apparatus by verifying a TDMA access file indicator of the test disc.

13. A method of verifying whether a recording/reproducing apparatus that records/reproduces a disc properly performs reading and modification operations, the method comprising;
   loading a prepared test disc in the recording and/or reproducing apparatus to be tested, the test disc including a predetermined temporary disc management area (TDMA) structure for use in managing defects prior to finalization of the test disc;
   issuing read commands to the recording and/or reproducing apparatus to be tested on which the test disc is loaded to read the test disc and verifying the TDMA structure read from the test disc in order to verify a reproducing operation of the apparatus;
   issuing write commands to the recording and/or reproducing apparatus to be tested on which the test disc is loaded such that the recording and/or reproducing apparatus records data on the test disc having the TDMA structure, and checking whether the TDMA structure is properly updated on the test disc in order to verify a modification operation of the apparatus; and
   issuing a closing command such that the recording/reproducing apparatus to be tested finalizes the test disc by copying the TDMA structure to a defect management area (DMA), and verifying the closing by comparing the DMA with a DMA reference mirror file.

14. The method of claim 13, wherein:
   the DMA of the test disc comprises a defect list (DFL), and a disc definition structure (DDS), and
   the comparing the DMA comprises comparing the DFL and the DDS with a reference DFL and a reference DDS of the DMA reference mirror file.

15. A method of verifying whether a recording/reproducing apparatus that records and/or reproduces a disc properly performs reading and modification operations, the method comprising:
   loading a prepared test disc in the recording/reproducing apparatus to be tested, the test disc including a predetermined temporary disc management area (TDMA) structure for use in managing defects prior to finalization of the test disc;
   issuing read commands to the recording and/or reproducing apparatus to be tested on which the test disc is loaded to read the test disc and verifying the TDMA structure read from the test disc in order to verify a reproducing operation of the apparatus; and
   issuing write commands to the recording and/or reproducing apparatus to be tested on which the test disc is loaded such that the recording/reproducing apparatus records data on the test disc having the TDMA structure, and checking whether the TDMA structure is properly updated on the test disc in order to verify a modification operation of the apparatus;
   wherein;
   the TDMA structure comprises a temporary disc management structure (TDMS) having a temporary disc definition structure (TDDS), a temporary defect list (TDFL), and sequential recording range information (SRRI), and
   the checking whether the TDMA structure is properly updated on the test disc comprises comparing the TDMS of the test disc with a TDMS included in a reference mirror TDMA file.

16. A recording and/or reproducing apparatus for use with a write once disc, the apparatus comprising:
   a light source to emit a light beam;
   an optical pickup to transfer data with respect to the write once disc using the emitted light beam; and
   a controller to control the light source to emit the light beam and to control the optical pickup to transfer data with respect to the write once disc prior to closing using temporary defect management information in a temporary defect management area (TDMA) of the write once disc in accordance with a temporary defect management standard, wherein the controller is verified as being compliant with the temporary defect management standard by receiving read commands to read a test disc and controlling the optical pickup to transfer data in accordance with the read commands so as to verify a TDMA structure read from the write once disc and thereby verify a read operation of the recording and/or reproducing apparatus;
   wherein the controller is verified as being compliant with the temporary defect management standard by receiving write commands to write data to the test disc, and controlling the optical pickup to transfer data in accordance with the write commands, including writing a TDMA access file indicator to the disc, so as to verify the TDMA access file indicator of the test disc and thereby verify a modification operation of the recording and/or reproducing apparatus;
   wherein the test disc includes a predetermined TDMA structure for use in managing defects prior to finalization of the test disc.

17. A method of verifying whether a recording and/or reproducing apparatus that records/reproduces a disc properly performs recording and/or modification operations, the method comprising:
   issuing write commands to a recording and/or reproducing apparatus to be tested and in which a test disc having a temporary disc management area (TDMA) structure is loaded such that the recording and/or reproducing apparatus records data on the test disc and updates the TDMA structure, the TDMA structure being independent of defects on the test disc; and
   verifying whether the TDMA structure was properly updated on the test disc in order to verify a recording operation of the apparatus to be tested;
   wherein the verifying comprises verifying a TDMA access file indicator of the test disc.

18. The method of claim 17, wherein the TDMA is in addition to a defect management area (DMA) in which temporary defect management information in TDMA is copied when the test disc is finalized.

19. The method of claim 17, wherein the test disc is a write once recording medium.

20. The method of claim 19, wherein the test disc is a Blu-ray (BD-R) disc.

21. The method of claim 20, wherein the TDMA is in addition to a defect management area (DMA) in which temporary defect management information in the TDMA is copied when the test disc is finalized.

22. The method of claim 17, wherein the verifying the TDMA structure of the test disc comprises comparing the TDMA structure of the test disc after the recording is performed with a predetermined TDMA structure in a TDMA reference mirror file.

23. The method of claim 22, wherein the issuing the write commands comprises issuing write commands which, if the recording and/or reproducing apparatus to be tested properly records data on the test disc having the TDMA structure, results in the updated TDMA structure which matches the predetermined TDMA structure in the TDMA reference mirror file.

24. The method of claim 17, wherein the verifying the TDMA access file indicator of the test disc comprises comparing the TDMA access file indicator with a reference mirror TDMA access file indicator file.

25. A method of verifying whether a recording/reproducing apparatus that records/reproduces a disc properly performs recording and/or modification operations, the method comprising:
    issuing write commands to a recording/reproducing apparatus to be tested and in which a test disc having a temporary disc management area (TDMA structure) is loaded such that the recording/reproducing apparatus records data on the test disc and updates the TDMA structure, the TDMA structure being independent of defects on the test disc;
    verifying whether the TDMA structure was properly undated on the test disc in order to verify a recording operation of the apparatus to be tested;
    issuing a closing command such that the recording/reproducing apparatus to be tested finalizes the test disc by copying the TDMA structure to a defect management area (DMA), and
    verifying the closing by comparing the DMA with a DMA reference mirror file.

26. The method of claim 25, wherein:
    the DMA of the test disc comprises a defect list (DFL), and a disc definition structure (DDS), and
    the comparing the DMA comprises comparing the DFL and the DDS with a DFL and a DDS of the DMA reference mirror file.

27. A method of verifying whether a recording/reproducing apparatus that records/reproduces a disc properly performs recording and/or modification operations, the method comprising:
    issuing write commands to a recording/reproducing apparatus to be tested and in which a test disc having a temporary disc management area (TDMA structure) is loaded such that the recording/reproducing apparatus records data on the test disc and updates the TDMA structure, the TDMA structure being independent of defects on the test disc; and
    verifying whether the TDMA structure was properly updated on the test disc in order to verify a recording operation of the apparatus to be tested;
    wherein:
        the TDMA structure comprises a temporary disc management structure (TDMS) having a temporary disc definition structure (TDDS), a temporary defect list (TDFL), and sequential recording range information (SRRI), and
        the checking whether the TDMA structure is properly updated on the test disc comprises comparing the TDMS of the test disc with a TDMS included in a reference mirror TDMA file.

28. An apparatus for verifying whether a recording/reproducing apparatus that records/reproduces a disc properly performs reproducing and modification operations, the apparatus comprising:
    a recording module to issue write commands to a recording and/or reproducing apparatus to be tested on which a write once test disc is loaded to control the recording/reproducing apparatus to record data to the test disc during a recording and/or modification operation and to update a temporary defect management area (TDMA) structure of the test disc; and
    a verifier which checks whether the TDMA structure is properly updated on the test disc in order to verify the recording and/or modification operation of the recording and/or reproducing apparatus to be tested;
    wherein the verifier further verifies a TDMA access file indicator of the test disc.

29. The apparatus of claim 28, wherein the TDMA is in addition to a defect management area (DMA) in which temporary defect management information in the TDMA is copied when the test disc is finalized.

30. The apparatus of claim 28, wherein the test disc is a Blu-ray (BD-R) disc.

31. The apparatus of claim 30, wherein the TDMA is in addition to a defect management area (DMA) in which temporary defect management information in the TDMA is copied when the test disc is finalized.

32. The apparatus of claim 28, wherein the verifier verifies the TDMA structure of the test disc by comparing the TDMA structure of the test disc after the recording is performed with a predetermined TDMA structure in a TDMA reference mirror file.

33. The apparatus of claim 32, wherein the recording module issues write commands which, if the recording/reproducing apparatus to be tested properly records data on the test disc having the TDMA structure, results in the updated TDMA structure which matches the predetermined TDMA structure in the TDMA reference mirror file.

34. The apparatus of claim 28 wherein the verifier verifies the TDMA access file indicator by comparing the TDMA access file indicator with a reference mirror TDMA access file indicator file.

35. An apparatus for verifying whether a recording/reproducing apparatus that records/reproduces a disc properly performs reproducing and modification operations, the apparatus comprising:
    a recording module to issue write commands to a recording/reproducing apparatus to be tested on which a write once test disc is loaded to control the recording/reproducing apparatus to record data to the test disc during a recording and/or modification operation and to update a temporary defect management area (TDMA) structure of the test disc; and
    a verifier which checks whether the TDMA structure is properly updated on the test disc in order to verify the recording and/or modification operation of the recording/reproducing apparatus to be tested;
    wherein the recording module further issues a closing command such that the recording/reproducing apparatus to be tested finalizes the test disc by copying the TDMA structure to a defect management area (DMA), and the verifier verifies the closing by comparing the DMA with a DMA reference mirror file.

36. The apparatus of claim 35, wherein:
    the DMA of the test disc comprises a defect list (DFL), and a disc definition structure (DDS), and
    the comparing the DMA comprises comparing the DFL and the DDS with a DFL and a DDS of the DMA reference mirror file.

37. An apparatus for verifying whether a recording/reproducing apparatus that records/reproduces a disc properly performs reproducing and modification operations, the apparatus comprising:
    a recording module to issue write commands to a recording/reproducing apparatus to be tested on which a write once test disc is loaded to control the recording/reproducing apparatus to record data to the test disc during a recording and/or modification operation and to update a temporary defect management area (TDMA) structure of the test disc; and a verifier which checks whether the TDMA structure is properly updated on the test disc in order to verify the recording and/or modification operation of the recording/reproducing apparatus to be tested;

wherein the TDMA structure comprises a temporary disc management structure (TDMS) having a temporary disc definition structure (TDDS), a temporary defect list (TDFL), and sequential recording range information (SRRI), and the verifier checks whether the TDMA structure is properly updated on the test disc by comparing the TDMS of the test disc with a TDMS included in a reference mirror TDMA file.

* * * * *